United States Patent
Matsunaga et al.

(10) Patent No.: US 7,565,011 B2
(45) Date of Patent: Jul. 21, 2009

(54) IMAGE PROCESSING APPARATUS INCLUDING AN IMAGE PROCESSING UNIT HAVING A PLURALITY OF IMAGE PROCESSING SUB-UNITS EACH ADAPTED TO BE CAPABLE OF BEING CHANGED IN CIRCUIT CONFIGURATION AND METHOD OF CONTROLLING THE IMAGE PROCESSING APPARATUS

(75) Inventors: Daisuke Matsunaga, Arakawa-ku (JP); Yasuki Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 697 days.

(21) Appl. No.: 11/268,255

(22) Filed: Nov. 7, 2005

(65) Prior Publication Data
US 2006/0098229 A1    May 11, 2006

(30) Foreign Application Priority Data
Nov. 10, 2004    (JP)    ............................. 2004-326584

(51) Int. Cl.
*G06K 9/34* (2006.01)
*B41B 1/00* (2006.01)
*G06K 9/00* (2006.01)

(52) U.S. Cl. ..................................... 382/173; 358/1.15
(58) Field of Classification Search ................. 382/173, 382/276, 277, 284, 298, 305; 358/1.15, 1.18, 358/1.9, 2.1, 443, 451, 452, 462, 504, 505, 358/523, 525, 530, 537
See application file for complete search history.

(56) References Cited

U.S. PATENT DOCUMENTS

| | | | | |
|---|---|---|---|---|
| 5,909,539 A | * | 6/1999 | Chikauchi | 358/1.18 |
| 6,005,680 A | * | 12/1999 | Luther et al. | 358/2.1 |
| 6,094,276 A | * | 7/2000 | Yamaguchi et al. | 358/1.15 |
| 6,172,763 B1 | * | 1/2001 | Toyoda et al. | 358/1.15 |
| 6,421,136 B2 | * | 7/2002 | Yamamoto | 358/1.15 |
| 6,542,646 B1 | * | 4/2003 | Bar-Yona | 382/284 |
| 6,698,948 B2 | * | 3/2004 | Ihara et al. | 400/61 |
| 7,081,965 B2 | * | 7/2006 | Taniguchi | 358/1.15 |

(Continued)

FOREIGN PATENT DOCUMENTS

JP    11-105371    4/1999

(Continued)

*Primary Examiner*—Amir Alavi
(74) *Attorney, Agent, or Firm*—Canon U.S.A., Inc. I.P. Division

(57) ABSTRACT

An image processing apparatus capable of performing a plurality of types of image processes on image data includes a dividing unit adapted to divide input image data into area images, a data generation unit adapted to generate data including an area image and type information indicating a type of an image process to be performed, an image processing unit including a plurality of image processing sub-units each capable of being reconfigured so as to function as a circuit capable of performing selected one of the plurality of types of image processes, a commanding unit adapted to command at least one of the plurality of image processing sub-units to be reconfigured so as to function as a circuit for performing an image process specified by the type information, and a transfer control unit adapted to transfer the area image to the image processing sub-unit specified by the commanding unit.

12 Claims, 25 Drawing Sheets

U.S. PATENT DOCUMENTS

| | | | |
|---|---|---|---|
| 7,206,087 B2 * | 4/2007 | Ryan et al. | 358/1.15 |
| 2001/0033391 A1 | 10/2001 | Kihara | |
| 2006/0056728 A1 * | 3/2006 | Silverbrook et al. | 382/276 |
| 2006/0098229 A1 * | 5/2006 | Matsunaga et al. | 358/2.1 |

FOREIGN PATENT DOCUMENTS

| | | |
|---|---|---|
| JP | 2002-008002 A | 1/2002 |
| JP | 2004-280293 | 10/2004 |

* cited by examiner

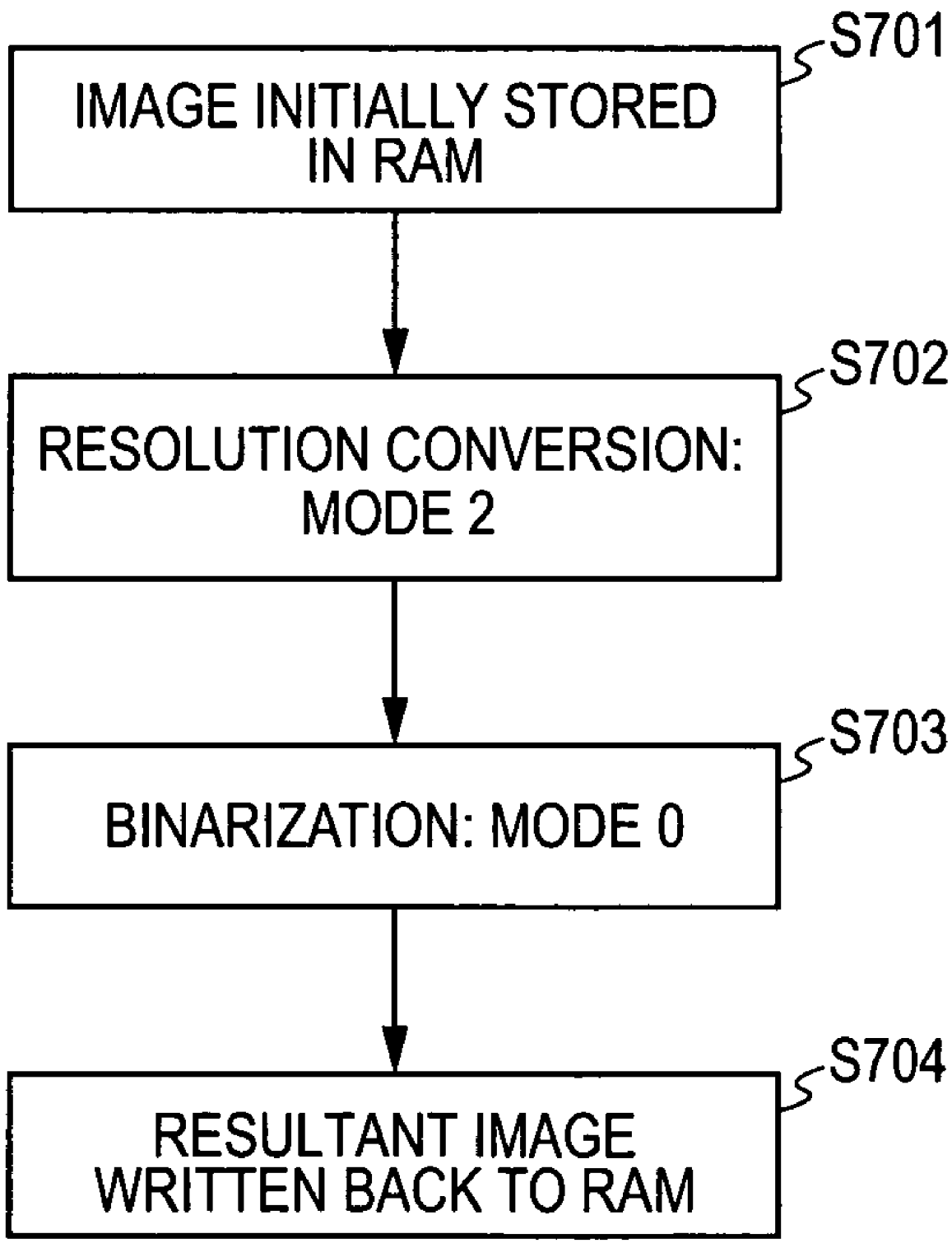

IP0: REWRITING INTO RAM 103
IP1: COLOR SPACE CONVERSION
IP2: RESOLUTION CONVERSION
IP3: BINARIZATION
IP4: ROTATION
PRT: PRINTING (TRANSFER TO PRINTER I/F UNIT)

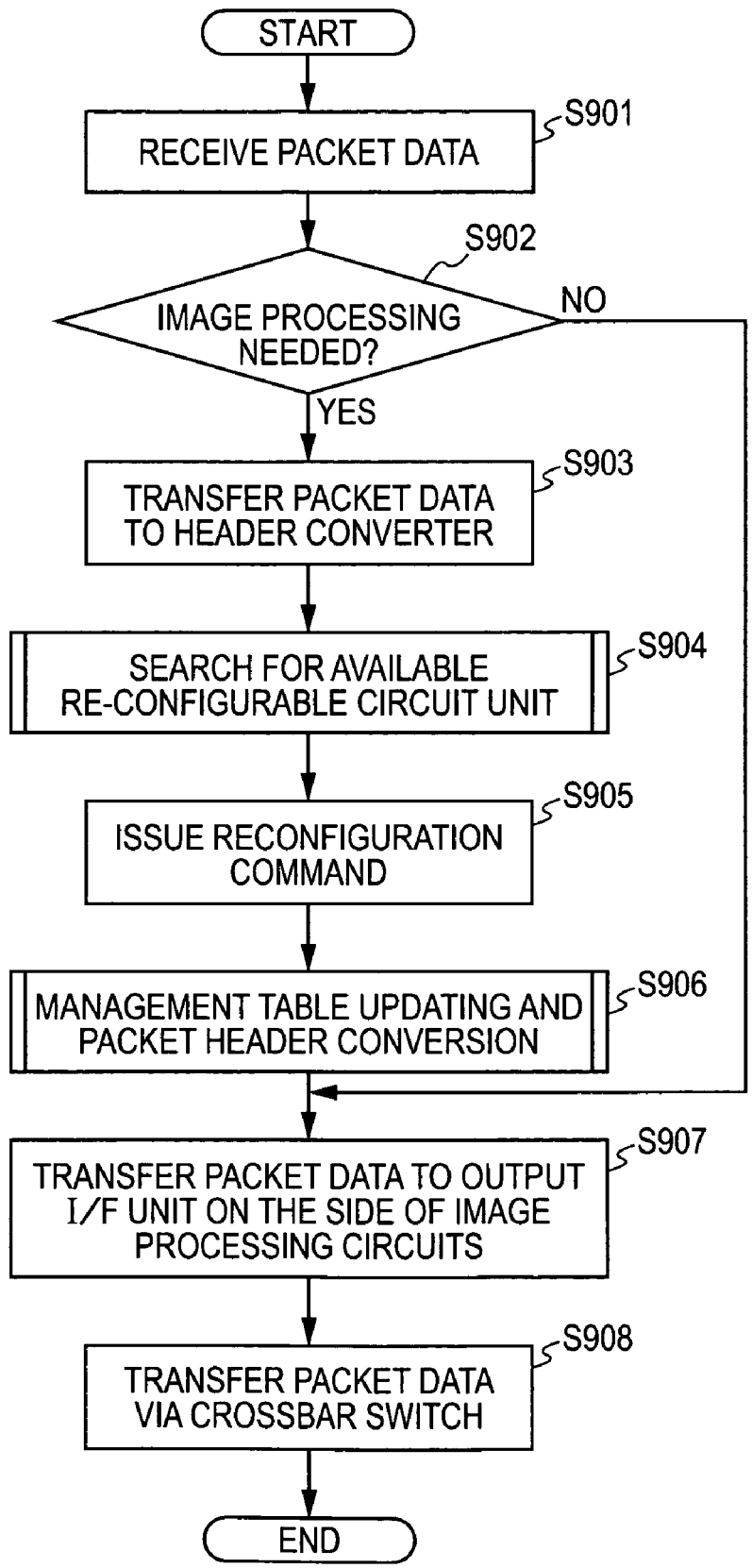

| RE-CONFIGURABLE CIRCUIT UNIT ID | PACKET ID USING RE-CONFIGURABLE CIRCUIT UNIT | IP FUNCTION ID (IPID) OF IP FUNCTION IMPLEMENTED IN RE-CONFIGURABLE CIRCUIT UNIT |
|---|---|---|
| 202 | PACKET1 | IP2 |
| 203 | PACKET2 | IP2 |
| 204 | 0 | IP1 |
| 205 | PACKET2 | IP3 |

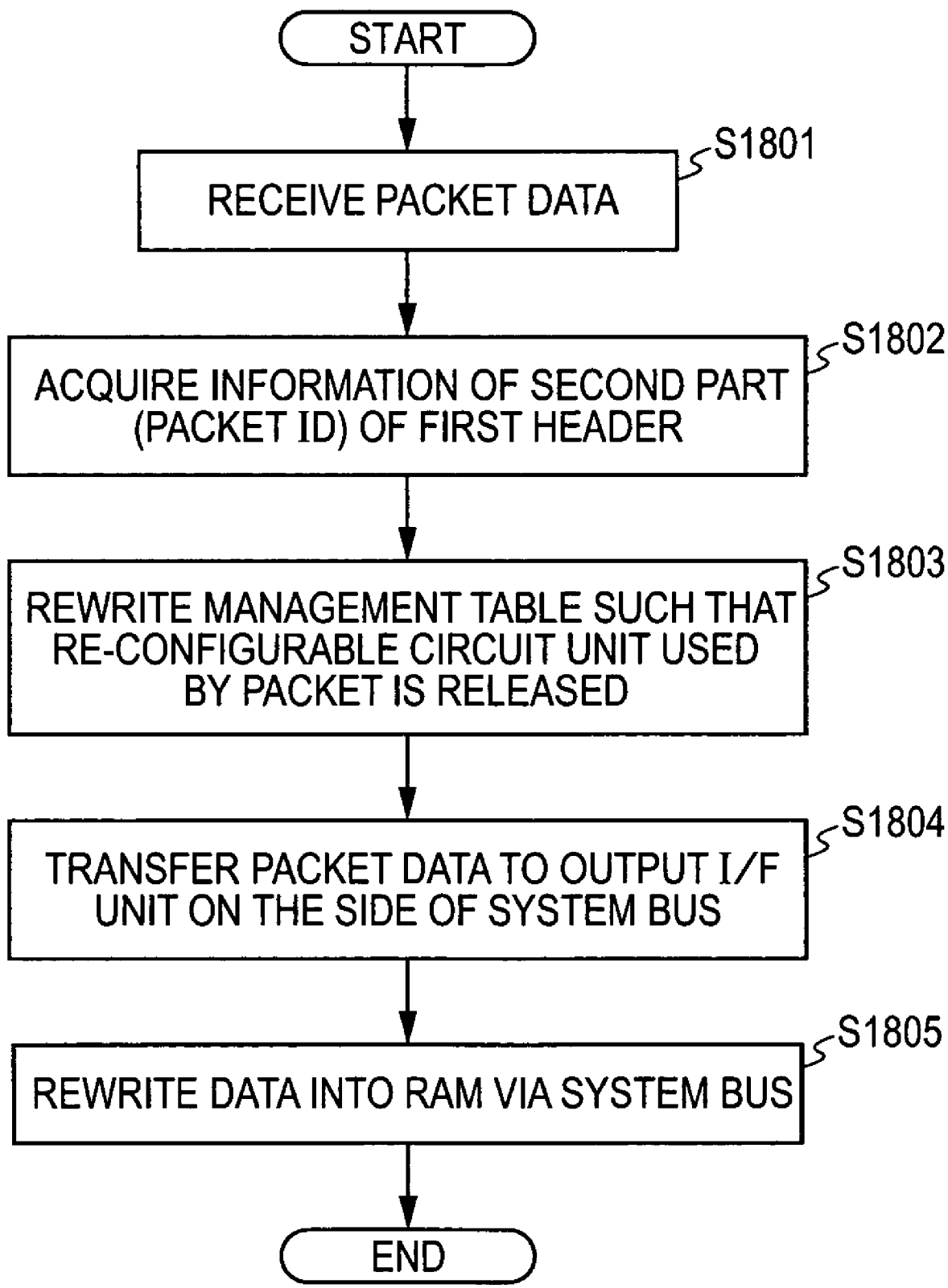

| RE-CONFIGURABLE CIRCUIT UNIT ID | PACKET ID USING RE-CONFIGURABLE CIRCUIT UNIT | IP FUNCTION ID (IPID) OF IP FUNCTION IMPLEMENTED IN RE-CONFIGURABLE CIRCUIT UNIT |
|---|---|---|
| 202 | PACKET0 | IP2 |
| 203 | 0 | IP3 |
| 204 | 0 | IP1 |
| 205 | PACKET0 | IP3 |

1901

| RE-CONFIGURABLE CIRCUIT UNIT ID | PACKET ID USING RE-CONFIGURABLE CIRCUIT UNIT | IP FUNCTION ID (IPID) OF IP FUNCTION IMPLEMENTED IN RE-CONFIGURABLE CIRCUIT UNIT |
|---|---|---|
| 202 | PACKET0 | IP2 |
| 203 | PACKET1 | IP2 |
| 204 | 0 | IP1 |
| 205 | PACKET0 | IP3 |

1902

| RE-CONFIGURABLE CIRCUIT UNIT ID | PACKET ID USING RE-CONFIGURABLE CIRCUIT UNIT | IP FUNCTION ID (IPID) OF IP FUNCTION IMPLEMENTED IN RE-CONFIGURABLE CIRCUIT UNIT |
|---|---|---|
| 202 | PACKET0 | IP2 |
| 203 | 0 | IP2 |
| 204 | 0 | IP1 |
| 205 | PACKET0 | IP3 |

FIG. 18

Table 2000:

| RE-CONFIGURABLE CIRCUIT UNIT ID | PACKET ID USING RE-CONFIGURABLE CIRCUIT UNIT | IP FUNCTION ID (IPID) OF IP FUNCTION IMPLEMENTED IN RE-CONFIGURABLE CIRCUIT UNIT |
|---|---|---|
| 202 | PACKET0 | IP2 |
| 203 | 0 | IP3 |
| 204 | 0 | IP1 |
| 205 | PACKET1 | IP3 |

Table 2001:

| RE-CONFIGURABLE CIRCUIT UNIT ID | PACKET ID USING RE-CONFIGURABLE CIRCUIT UNIT | IP FUNCTION ID (IPID) OF IP FUNCTION IMPLEMENTED IN RE-CONFIGURABLE CIRCUIT UNIT |
|---|---|---|
| 202 | 0 | IP2 |
| 203 | 0 | IP2 |
| 204 | 0 | IP1 |
| 205 | PACKET1 | IP3 |

Table 2002:

| RE-CONFIGURABLE CIRCUIT UNIT ID | PACKET ID USING RE-CONFIGURABLE CIRCUIT UNIT | IP FUNCTION ID (IPID) OF IP FUNCTION IMPLEMENTED IN RE-CONFIGURABLE CIRCUIT UNIT |
|---|---|---|
| 202 | PACKET2 | IP2 |
| 203 | PACKET2 | IP3 |
| 204 | PACKET2 | IP4 |
| 205 | PACKET1 | IP3 |

Table 2003:

| RE-CONFIGURABLE CIRCUIT UNIT ID | PACKET ID USING RE-CONFIGURABLE CIRCUIT UNIT | IP FUNCTION ID (IPID) OF IP FUNCTION IMPLEMENTED IN RE-CONFIGURABLE CIRCUIT UNIT |
|---|---|---|
| 202 | 0 | IP2 |
| 203 | 0 | IP3 |
| 204 | 0 | IP4 |
| 205 | PACKET1 | IP3 |

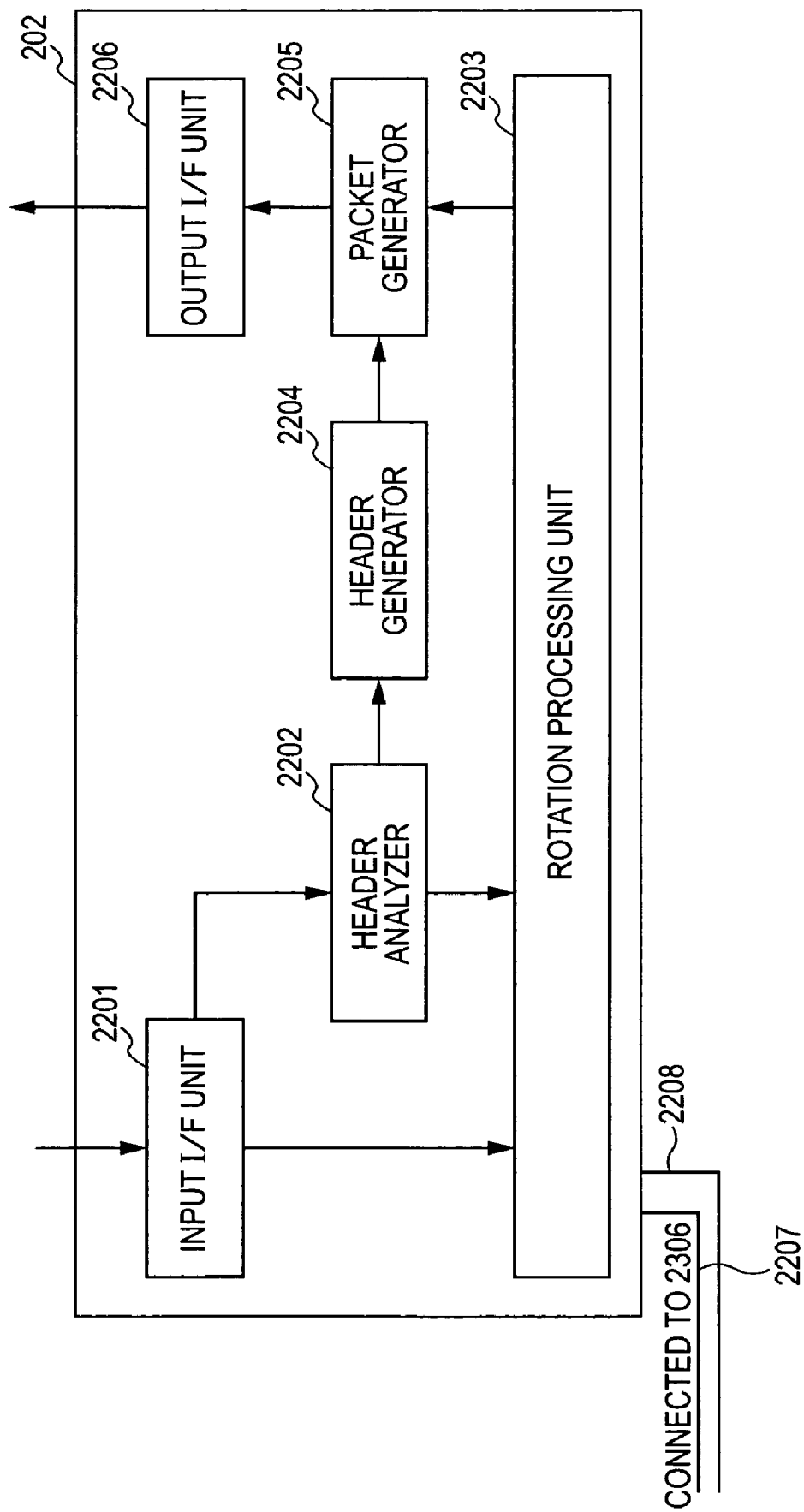

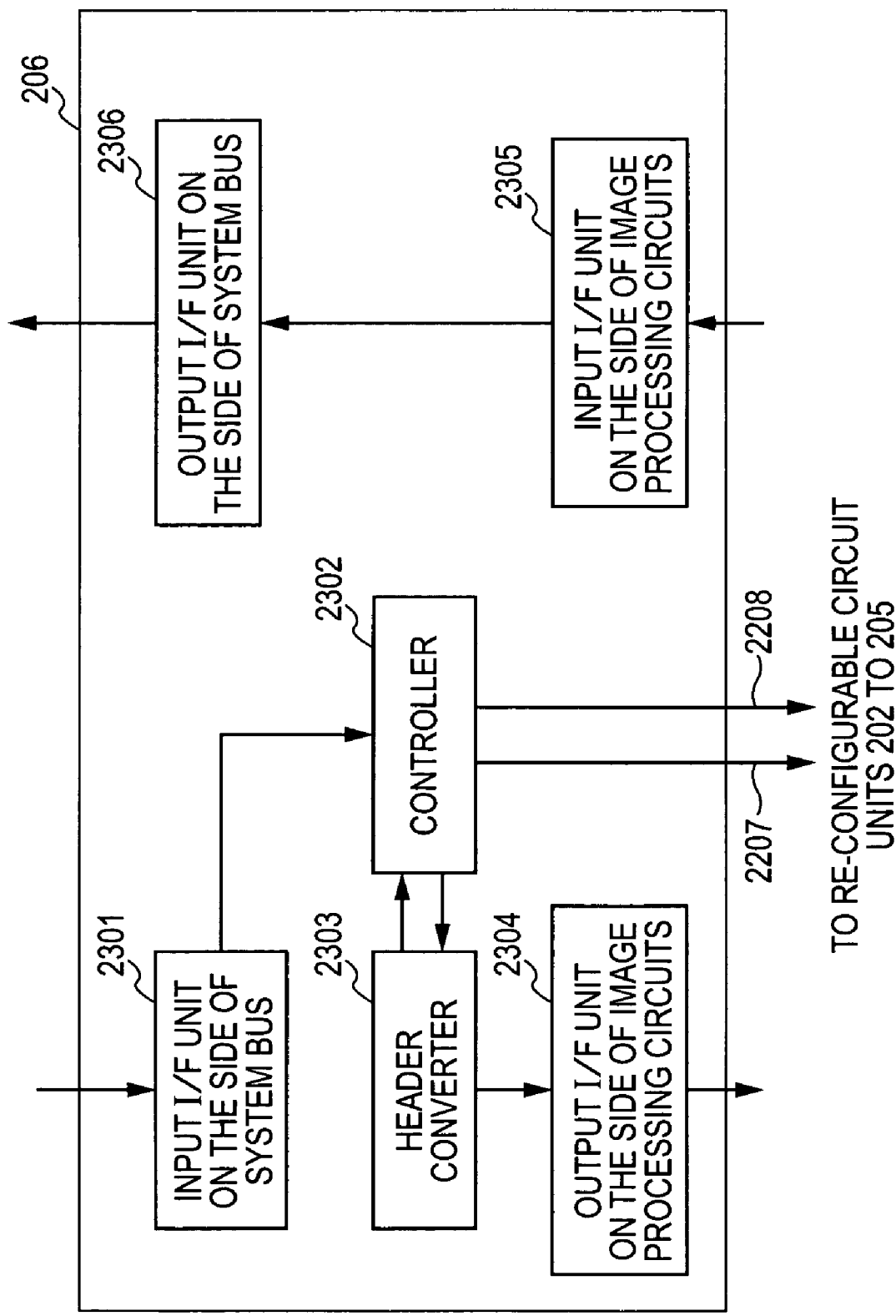

| RE-CONFIGURABLE CIRCUIT ID | JOB ID | FUNCTION ID | | | | | | | |
|---|---|---|---|---|---|---|---|---|---|
| | | 1 | 2 | 3 | 4 | 5 | 6 | 7 | 8 |
| 1(202) | 0x01 | 0x1 | 0x5 | 0x3 | – | – | – | – | – |
| 2(203) | – | – | – | – | – | – | – | – | – |
| 3(204) | – | – | – | – | – | – | – | – | – |
| 4(205) | – | – | – | – | – | – | – | – | – |

FUNCTION ID
0x1: COLOR SPACE CONVERSION
0x2: RESOLUTION CONVERSION
0x3: BINARIZATION
0x5: FILTERING

| RE-CONFIGURABLE CIRCUIT ID | JOB ID | FUNCTION ID | | | | | | | |
|---|---|---|---|---|---|---|---|---|---|
| | | 1 | 2 | 3 | 4 | 5 | 6 | 7 | 8 |
| 1(202) | 0x01 | 0x5 | 0x3 | – | – | – | – | – | – |
| 2(203) | – | – | – | – | – | – | – | – | – |
| 3(204) | – | – | – | – | – | – | – | – | – |
| 4(205) | – | – | – | – | – | – | – | – | – |

FUNCTION ID
0x1: COLOR SPACE CONVERSION
0x2: RESOLUTION CONVERSION
0x3: BINARIZATION
0x5: FILTERING

| RE-CONFIGURABLE CIRCUIT ID | JOB ID | FUNCTION ID | | | | | | | |
|---|---|---|---|---|---|---|---|---|---|
| | | 1 | 2 | 3 | 4 | 5 | 6 | 7 | 8 |
| 1(202) | 0x01 | 0x3 | – | – | – | – | – | – | – |
| 2(203) | 0x02 | 0x1 | 0x2 | – | – | – | – | – | – |
| 3(204) | – | – | – | – | – | – | – | – | – |
| 4(205) | – | – | – | – | – | – | – | – | – |

FUNCTION ID
0x1: COLOR SPACE CONVERSION
0x2: RESOLUTION CONVERSION
0x3: BINARIZATION
0x5: FILTERING

IMAGE PROCESSING APPARATUS INCLUDING AN IMAGE PROCESSING UNIT HAVING A PLURALITY OF IMAGE PROCESSING SUB-UNITS EACH ADAPTED TO BE CAPABLE OF BEING CHANGED IN CIRCUIT CONFIGURATION AND METHOD OF CONTROLLING THE IMAGE PROCESSING APPARATUS

BACKGROUND OF THE INVENTION

1. Field of the Invention

The present invention relates to an image processing apparatus and a method of controlling an image processing apparatus.

2. Description of the Related Art

Digital multi-function peripherals (MFPs) having multiple functions such as a copying function, a facsimile function, etc. are widely used. In the MFP, an input/output operation of a scanner unit or a printer unit, a process of making a connection to a network or a communication line, image processing on image data, and a combination of two or more of the operations described above are controlled by a controller (CPU) responsible for controlling the entire system.

The MFP usually includes an image processing unit capable of performing a plurality of image processing such as a resolution conversion, binarization, rotation, color conversion, etc. on input image data. Various techniques in terms of parallel processing of two or more image processes have been proposed to increase the operation speed of the MFP. For example, in a copying machine disclosed in Japanese Unexamined Patent Application Publication No. 2002-8002 (corresponding to US Publication No. 2001-0033391 A1), image data in units of pages are divided into image data in units of particular sizes, and image processing is performed in the units of the divided image data (i.e., the particular sizes).

More specifically, header information in which image processing information is described is attached to each of the divided image data. In the image processing information (header information), apparatus identification information is described from the beginning of the header in the same order as the order in which apparatus are used in processing. In accordance with the apparatus identification information, the divided image data are transferred to respective image processing modules. Thus, image processes are performed without imposing a large processing load on the CPU.

Another aspect of this technique is that it is possible to perform, in parallel, different image processes on a plurality of divided image data.

However, in the copying machine disclosed in Japanese Unexamined Patent Application Publication No. 2002-8002, it is impossible to perform in parallel the same image process on a plurality of divided image data, although it is possible to perform in parallel different image processes on a plurality of divided image data.

In the technique disclosed in Japanese Unexamined Patent Application Publication No. 2002-8002, the copying machine includes a total of four image processing modules, that is, a color space conversion processing unit, a resolution conversion processing unit, a binarization processing unit, and a rotation processing unit, which serve as image processing units that perform respective image processes on divided image data. For example, in this technique, although it is possible to perform in parallel a color conversion on divided image data and a resolution conversion on another divided image data by operating corresponding modules at the same time, it is impossible to perform in parallel a color conversion on a plurality of divided image data, because there is only one module for the color conversion.

In many cases, the same image process is performed on respective image data generated by dividing original image data in units of pages. However, in the copying machine disclosed in Japanese Unexamined Patent Application Publication No. 2002-8002, it is impossible to perform in parallel an image process on divided image data generated from one page of original image data, and thus it takes a long time to perform the image process.

One technique to solve the above problem is to provide a plurality of modules for each image process such that the plurality of modules can be used at the same time to perform in parallel the same image process. However, the result is an increase in the circuit complexity and a corresponding increase in cost, and thus this technique is not a good solution.

SUMMARY OF THE INVENTION

In view of the above, the present invention provides an improved image processing apparatus and an improved method of controlling an image processing apparatus.

The present invention also provides an image processing apparatus and a method of controlling an image processing apparatus, capable of processing a plurality of area image data in parallel by using a plurality of image processing units capable of performing plural types of image processes.

In an aspect, the invention provides an image processing apparatus capable of performing plural types of image processes on image data, including a dividing unit adapted to divide input image data into area images with a predetermined size, a data generation unit adapted to generate data by adding type information indicating a type of an image process to be performed to the area image, an image processing unit including a plurality of image processing subunits each adapted to be capable of performing a plurality of types of image processes on the area image and adapted to be capable of being changed in circuit configuration to perform the plurality of types of image processes, a commanding unit adapted to command at least one of the plurality of image processing subunits to be changed so as to have a circuit configuration capable of performing an image process specified by the type information, and a transfer control unit adapted to transfer the area image to the image processing subunit specified by the commanding unit to be changed in the circuit configuration.

In an aspect, the present invention provides a method of controlling an image processing apparatus capable of performing plural types of image processes on image data, including the steps of dividing input image data into area images with a predetermined size, generating data by adding type information indicating a type of an image process to be performed to the area image, commanding at least one of the plurality of image processing subunits, which are capable of performing plural types of image processes on the area image, to be changed so as to have a circuit configuration capable of performing an image process specified by the type information, and transferring the area image to the image processing subunit specified by the commanding unit to be changed in the circuit configuration.

Other features and aspects of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 7 is a flow chart illustrating an exemplary operation of an image processing unit according to an embodiment of the present invention.

FIG. 9A is a flow chart illustrating an exemplary process performed on packet data.

FIG. 16 is a flow chart illustrating an exemplary operation of a reconfigurable circuit manager according to an embodiment of the present invention.

FIG. 17 is a diagram illustrating exemplary state transitions of a management table according to an embodiment of the present invention.

FIG. 18 is a diagram illustrating exemplary state transitions of a management table according to an embodiment of the present invention.

FIG. 20 is a block diagram illustrating an exemplary image processing unit according to an embodiment of the present invention.

FIG. 21 is a block diagram illustrating an exemplary architecture of a reconfigurable circuit unit according to an embodiment of the present invention.

FIGS. 22A to 22C are diagrams illustrating examples of management tables according to an embodiment of the present invention.

DESCRIPTION OF THE EMBODIMENTS

Figure 1:
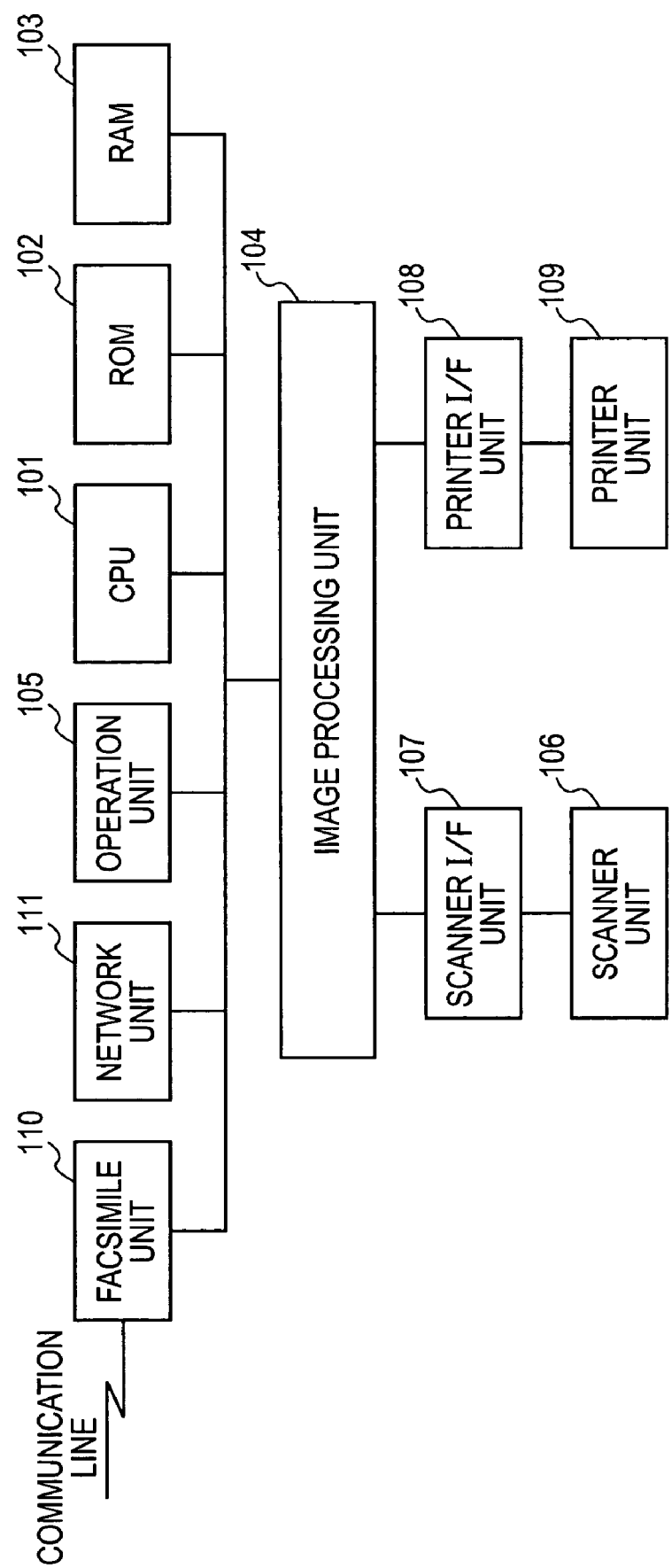
FIG. 1 is a block diagram illustrating an MFP, which is an example of an image processing apparatus according to an embodiment of the present invention.

The present invention will now be described in detail with reference to the drawings showing various embodiments, features and aspects thereof. In the drawings, elements and parts which are identical throughout the views are designated by identical reference numerals, and duplicate description thereof is omitted.

First Exemplary Embodiment

FIG. 1 is a block diagram illustrating an exemplary MFP (Multi Function Peripheral) serving as an image processing apparatus. Although in the embodiments described below, it is assumed that the MFP has a plurality of functions such as a facsimile function, a printing function, a copying function, etc. and is capable of dealing with color image data, the MFP may be capable of dealing with only monochrome image data.

First, the general architecture of the MFP according to the present embodiment is described with reference to a block diagram shown in FIG. 1. A CPU 101 controls the operation of the MFP including various parts such as an image input/output apparatus including a scanner unit and a printer unit, an image processing unit, and a communication unit. The CPU 101 also performs a process of generating packet data described later. An operation program for controlling the operation of the MFP is stored in a ROM 102. A RAM 103 is used as a work area in the operation of the MFP, and is used to store tile image data (area image data) which is described later.

An image processing unit 104 includes a plurality of image processing (IP) function units for performing various image processes on packet data. Specific examples of image processes include a color space conversion process, a resolution conversion process, a binarization process, and a rotation process.

An operation unit 105 displays various kinds of information including information indicating the status of the MFP and setting information. A user is allowed to issue an operation command by operating the operation unit 105. The issued operation command is transferred from the operation unit 105 to the CPU 101.

A scanner unit 106 is an image reading apparatus that reads an image and generates corresponding image data. The scanner unit 106 includes a lens for focusing light reflected from a document, a CCD sensor for converting incident light into an electrical signal, an analog signal processing unit, and an analog-to-digital converter (not shown).

The scanner unit 106 outputs the obtained image data to a scanner I/F (interface) unit 107. The scanner I/F unit 107 performs various scanner image processing such as a spatial filtering process or an input color space conversion on the image data received from the scanner unit 106. The scanner I/F unit 107 divides the image data in units of pages into a plurality of tile image data (described later) and outputs the resultant tile image data to the image processing unit 104.

A printer. I/F unit 108 performs printer image processing such as an image area (object) process or a smoothing process on image data output from the image processing unit 104. The printer I/F unit 108 is capable of combining a plurality of tile image data into page image data and outputting the resultant page image data to a printer unit 109. The printer unit 109 forms an image on a printing medium in accordance with the image data output from the printer I/F unit 108. For example, the printer unit 109 may be a laser beam printer or an LED printer. In the case in which a laser beam printer is used as the printer unit 109, the printer unit 109 includes an exposure unit including a semiconductor laser device, an image forming unit, and a paper feeding unit (not shown).

An operation control command is issued from the CPU 101 and supplied, via the image processing unit 104, to the scanner I/F unit 107, the printer I/F unit 108, and/or the printer unit 109.

A facsimile unit 110 transmits/receives image data via a communication line in accordance with setting information given via the operation unit 105 and performs a particular facsimile processing. A network unit 111 serves to make a connection to various devices such as a personal computer or another MFP on a network via a LAN or the like.

Figure 2:
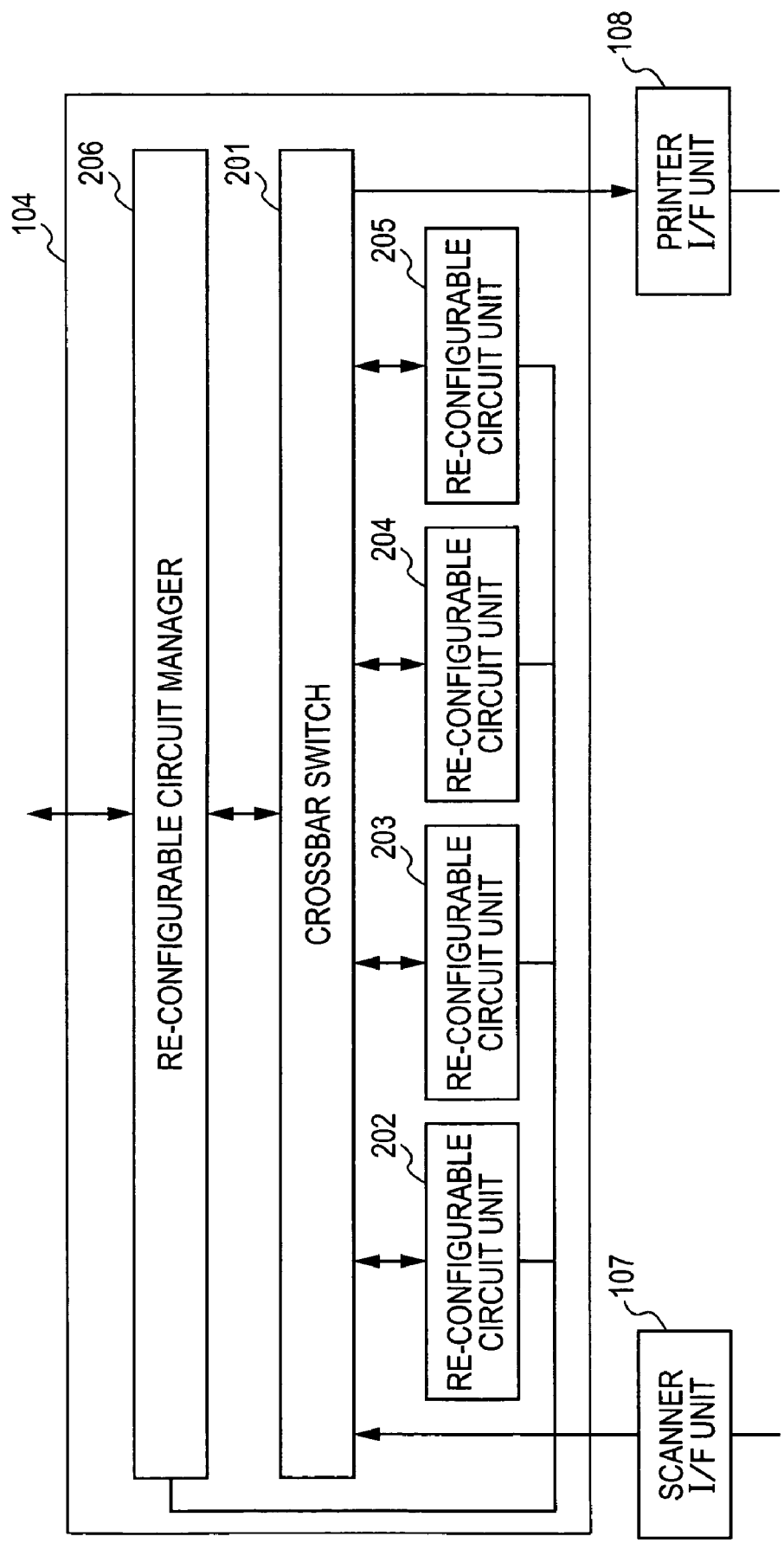
FIG. 2 is a block diagram illustrating exemplary image processing units according to an embodiment of the present invention.

An exemplary image processing unit 104 is described in further detail below with reference to a block diagram shown in FIG. 2. A crossbar switch 201 connects particular parts such as IP function units, the scanner I/F unit 107, and the printer I/F unit 108 in the image processing unit 104 to each other so that image data can be transferred between connected parts.

Each of reconfigurable circuit units 202 to 205 is reconfigured so as to function as one of IP (Image Processing) units in accordance with a control signal issued by a reconfigurable circuit manager 206.

An FPGA (Field Programmable Gate Array) is known as a device whose circuit is reconfigurable. In recent years, an RCP (Reconfigurable Processor) has been developed which can be reconfigured in a short time corresponding to one to a few tens of internal clock cycles. The RCP can be higher in integration density than the FPGA, and thus can perform high-complexity processing. Besides, the RCP can operate at a much higher operation speed and can be reconfigured in a much shorter time than the FPGA. In the present embodiment of the invention, in view of the above, to achieve a reduction in the processing time associated with the image processing, RCPs may be used as the reconfigurable circuit units 202 to 205.

In this first embodiment, and in accordance with a control signal from the re-configurable circuit manager 206, each of the reconfigurable circuit units 202 to 205 is capable of being reconfigured into an image processing circuit that performs one of four image processes: a color space conversion process, a resolution conversion process, a binarization process, and a rotation process. That is, any one of the four image processes can be implemented independently by each of the reconfigurable circuit units 202 to 205. As a matter of course, each reconfigurable circuit unit configured so as to perform one of image processes can be reconfigured so as to perform another one of image processes.

The color space conversion process is a process of converting input image data represented in an RGB color space into image data represented in another type of color space, that is, a CMYK color space.

The resolution conversion process is a process of converting the resolution of input image data. In the present embodiment, it is assumed that the image data produced in the scanning process by the scanner unit 106 has a resolution of 600×600 dpi. In the resolution conversion process, the image data having the resolution of 600×600 dpi is converted into image data having another resolution such as 100×200 dpi.

The binarization process is a process of converting input image data into a binary form using a binarization method such as a simple binarization method, a dithering method, or an error diffusion method, depending on the type of image data such as a text image or a photographic image.

The rotation process is a process of rotating input image data by a particular angle such as 90°, 180°, or 270°. Note that although in the present embodiment, the image processing unit 104 is capable of performing the four image processes described above, image processes performed by the image processing unit 104 are not limited to these four image processes.

The reconfigurable circuit manager 206 is a unit that manages the reconfigurable circuit units 202 to 205. If packet data (described later) to be subjected to image processing is input, the reconfigurable circuit manager 206 searches for an available reconfigurable circuit unit. If an available reconfigurable circuit unit is detected, the reconfigurable circuit manager 206 sends a reconfiguration command to the detected reconfigurable circuit unit so that the reconfigurable circuit unit is reconfigured into an image processing circuit specified in a header of the packet data, and the reconfigurable circuit manager 206 rewrites the header such that the packet data is transferred to the reconfigured reconfigurable circuit unit. The management and the processing performed by the reconfigurable circuit manager 206 will be described in further detail later.

Figure 3:
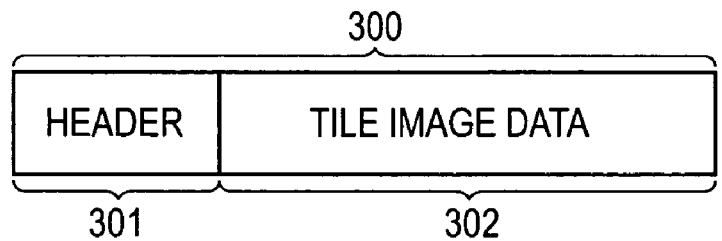
FIG. 3 is a diagram illustrating an exemplary format of packet data according to an embodiment of the present invention.

Now, packet data and a method of producing the packet data according to the present embodiment are described. FIG. 3 shows an exemplary format of packet data according to the first embodiment of the present invention. The packet data 300 includes a header 301 and tile image data 302. The "tile image data" refers to image data with a rectangular area having particular vertical and horizontal size as measured by the numbers of pixels. The time image data 302 is stored in advance in the RAM 103.

Because the header 301 is rewritten by the reconfigurable circuit manager 206, the content of the header 301 becomes different depending on whether or not the process is performed within the image processing unit 104. In the case in which the process is performed within the image processing unit 104, the header 301 includes information indicating module IDs of respective reconfigurable circuit units and image processing information indicating image processes to be performed by the respective reconfigurable circuit units wherein the module IDs and the image processing information indicating the corresponding image processes are described in the same order as the order in which the image processes are to be performed.

On the other hand, in the case in which the process is performed not only internally in the image processing unit 104 but also externally, the header 301 includes information indicating types of image processes, the order of performing the processes, and image processing information indicating the details of the respective image processes. More specifically, for example, the image processing information associated with the rotation processing, which is one of image processes, indicates a particular angle, such as 90°, 180° or 270°, by which to rotate the image data.

Figure 4:
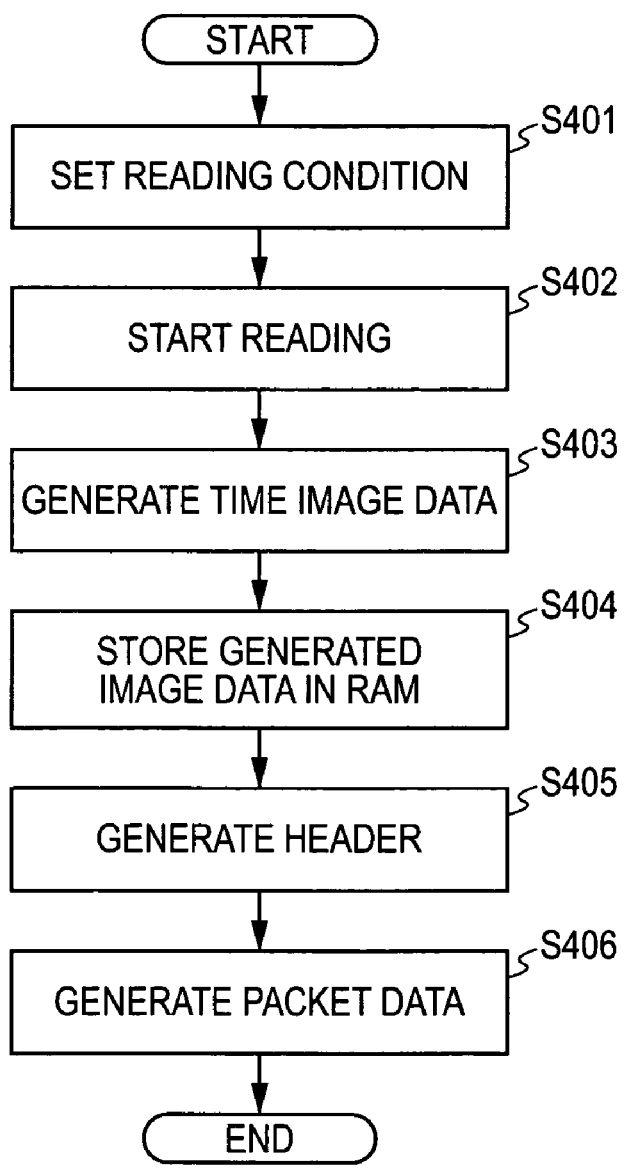
FIG. 4 is a flow chart illustrating an exemplary process of generating packet data according to an embodiment of the present invention.

The process of generating the packet data 300 is briefly described below with reference to a flow chart shown in FIG. 4, for a case in which image data in units of pages generated in the scanning process by the scanner unit 106 is stored in the RAM 103.

First, a user operates the operation unit 105 to set conditions associated with an image reading process (step S401). After the image reading conditions are set, the user issues a read start command. In response to receiving the command, the CPU 101 controls the scanner 106 to start reading a document (step S402). The image data generated in units of pages by the scanner unit 106 is input to the scanner I/F unit 107. Under the control of the CPU 101, the scanner I/F unit 107 divides the page image data into tile image data with a particular size (step S403).

Figure 5:
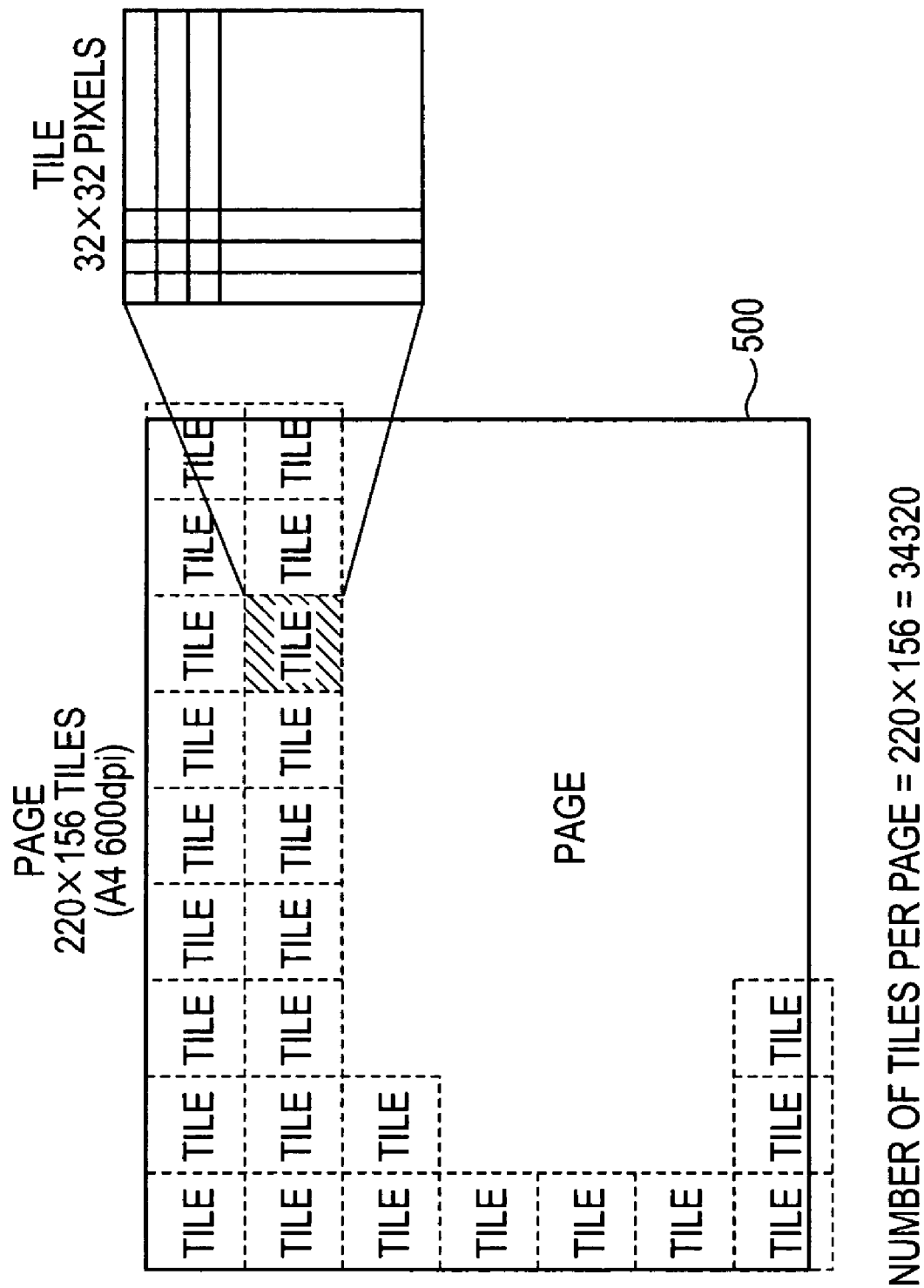
FIG. 5 is a diagram illustrating exemplary details of the process of generating packet data according to an embodiment of the present invention.

The generation process in step S403 is described in detail below. As shown in FIG. 5, one page of document image data 500 in the form of raster image data input from the scanner unit 106 is divided into a plurality of rectangular areas (tiles). Each rectangular area has an exemplary size of 32 pixels in both vertical and horizontal directions, and image data is generated for each rectangular area. If image data with a resolution of 600×600 dpi is generated by the scanner unit 106 by reading a document with an A4 size, and if the image data is divided into tile image data each having a size of 32×32 pixels, 34320 tile image data are generated from image data of one page of document with the A4 size.

In the tile image generation process, for convenience in the image processing and/or depending on the reading resolution, the CPU 101 may set the scanner I/F unit 107 such that each tile image data has a proper shape and/or a proper size.

The generated tile image data are input to the image processing unit 104 and transferred to the RAM 103 via the crossbar switch 201. Each tile image data is temporarily stored together with identification information at a particular location in the RAM 103 (step S404). A management table associated with the tile image data may be generated in the RAM 103 such that addresses and identification information are managed based on the management table for all tile image data.

The CPU 101 then generates a header based on the image processing command issued via the operation unit 105 or setting information input via a device connected via the network 111 (step S405). As described earlier, the generated header includes information specifying image processes to be performed and image processing information indicating the details of the respective image processes to be performed. The image processes are described in the header in the same order as the order in which the image processes should be performed.

The CPU 101 reads the tile image data corresponding to the respective headers from the RAM 103. The CPU 101 attaches the respective headers to the tile image data thereby generating packet data to be transmitted to the image processing unit 104. Thereafter, the process is ended (step S406).

The exemplary process of generating packet data has been described above for the case in which the packet data is generated based on the image data supplied by the scanner unit 106. Note that the original image data from which to generate packet data is not limited to that supplied by the scanner unit 106, but image data may be supplied via the network 111, from the facsimile unit 110, or other data sources.

In the MFP according to the first embodiment, the network unit 111 and the facsimile unit 110 are capable of receiving image data transmitted from an external apparatus or the like and storing the received image data in the RAM 103. In the case in which the image data is stored in the form of tile image data into the RAM 103, the dividing of the image data into time image data may be performed by the CPU 101. Alternatively, the network unit 111 or the facsimile unit 110 may divide the received image data into tile image data and may transfer the resultant tile image data to the RAM 103.

In the first embodiment, the MFP may include a storage device such as an HDD (Hard Disk Drive) (not shown) and a disk controller (not shown) for connecting the HDD to the system bus of the MFP and controlling accessing to the HDD and transferring of image data to/from the HDD. Also in this case, the CPU 101 may divide the image data received from the disk controller into tile image data, or the disk controller may divide the image data into tile image data and transfer the resultant tile image data to the RAM 103.

In the case in which the image data is input from an external apparatus or the HDD, and tile image data are temporarily stored in the RAM 103, the process of generating packet data is started from step S405.

Now, the internal structure of each of the reconfigurable circuit units 202 to 205 is described. The reconfigurable circuit units realized by the RCPs are similar in device architecture to each other. In the present embodiment, each RCP reconfigured so as to function as a circuit that performs one of the image processes has a similar internal architecture regardless of the image process to be performed by the reconfigured RCP, as described below. In the following explanation of the internal structure of the reconfigurable circuit unit 202 with reference to a block diagram shown in FIG. 6, it is assumed by way of example that the reconfigurable circuit unit is reconfigured so as to function as a circuit that performs the rotation process.

If an input I/F (interface) unit 601 connected to the crossbar switch 201 receives packet data, the input I/F unit 601 divides the received packet data into a header and tile image data. The header is sent to a header analyzer 602, and the tile image data is sent to a rotation processing unit 603. The header analyzer 602 extracts image processing information indicating the details of the image process to be performed from the header received from the input I/F unit 601 and analyzes the extracted image processing information. The header analyzer 602 determines that information described at the beginning of the image processing information indicates the details of the process to be performed by the rotation processing unit 603, and the header analyzer 602 sets the information associated with the details of the image process in the rotation processing unit 603.

As will be described later, the information described in the header to indicate the details of the image process to be performed is a mode number identifying which one of a plurality of operation modes the rotation processing unit 603 should operate in. The mode number corresponds to a rotation angle by which the image data should be rotated by the rotation processing unit 603. After the analysis, the header analyzer 602 transfers the header to a header generator 604.

The rotation processing unit 603 rotates the image data received from the input I/F unit 601 in accordance with the information specifying the details of the image process set by the header analyzer 602. For example, the rotation processing unit 603 rotates the image data by 0°, 90°; 180°, or 270° specified by the information indicating the details (mode), and transmits the rotated image data to a data selector 605.

The header generator 604 rewrites the header of the packet data to be input to the image processing unit, based on the header input from the header analyzer 602. The header generator 604 sends the resultant header to the data selector 605. The data selector 605 combines the header received from the header generator 605 and the image data output from the rotation processing unit 603, and outputs the resultant combined data as packet data. An output I/F unit 606, which is connected to the crossbar switch 201, outputs the packet data to the crossbar switch 201.

Another aspect of the present embodiment is that the reconfigurable circuit manager 206 issues a circuit configuration selection signal 607 to specify which one of the four image processing functions should be implemented by reconfiguring the reconfigurable circuit unit 202.

The reconfigurable circuit units 203 to 205 each have an internal structure similar to that of the reconfigurable circuit unit 202 described above. When a reconfigurable circuit unit 202 to 205 is reconfigured so as to implement one of the other IP functions, the internal structure is similar to that described above except that the IP function unit is changed from the rotation processing unit (function) to a color space conversion processing unit (function), a resolution conversion processing unit (function), or a binarization processing unit (function) or the like.

Figure 10:
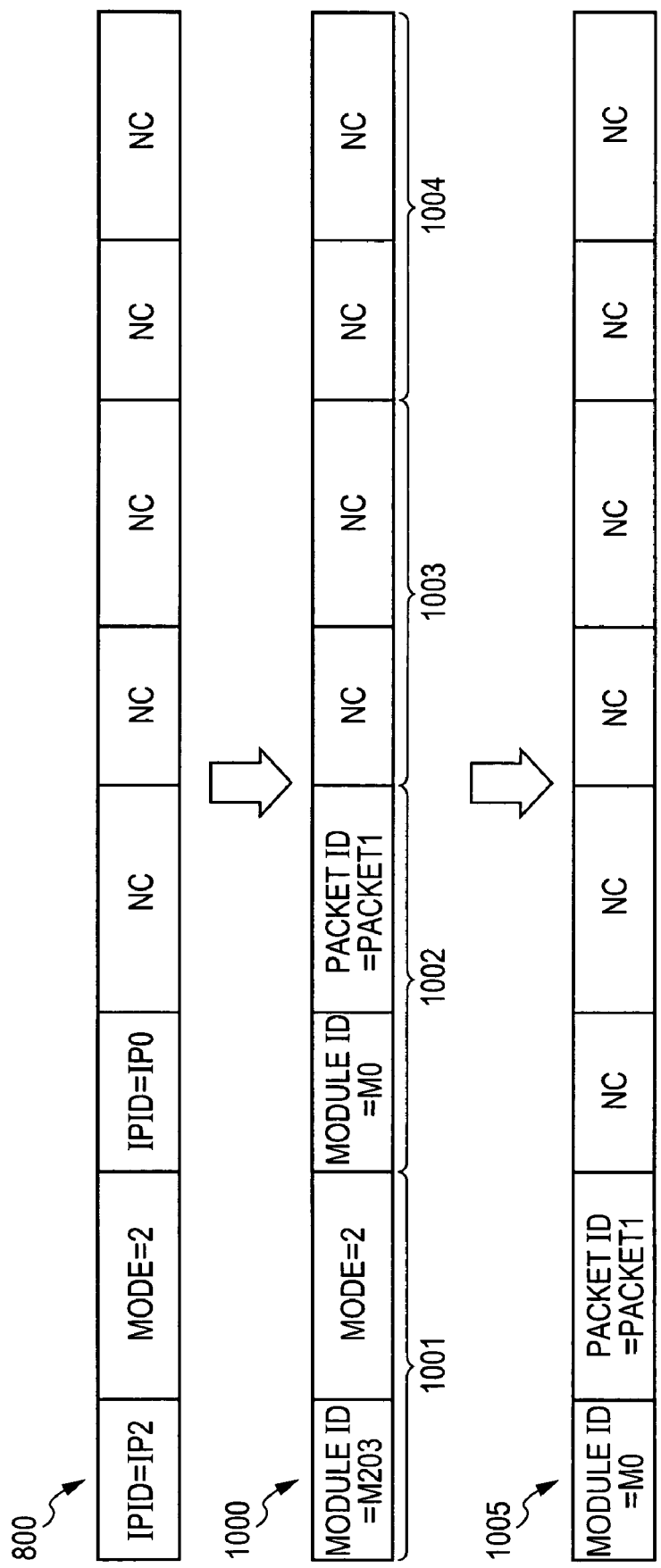
FIG. 10 is a diagram illustrating an exemplary conversion of a header according to an embodiment of the present invention.

An example of a process performed on image data by the image processing unit 104 in a particular mode is described below with reference to the flow chart shown in FIG. 7. During the process, the state of the header of the packet data changes as shown in FIG. 10.

As shown in FIG. 7, the image data is stored in advance in the RAM 103 (step S701) and is first processed in mode-2 to perform the resolution conversion (step S702) and then in mode-0 to perform the binarization (step S703). The resultant image data is written back into the RAM 103 (step S704).

Figure 8A:
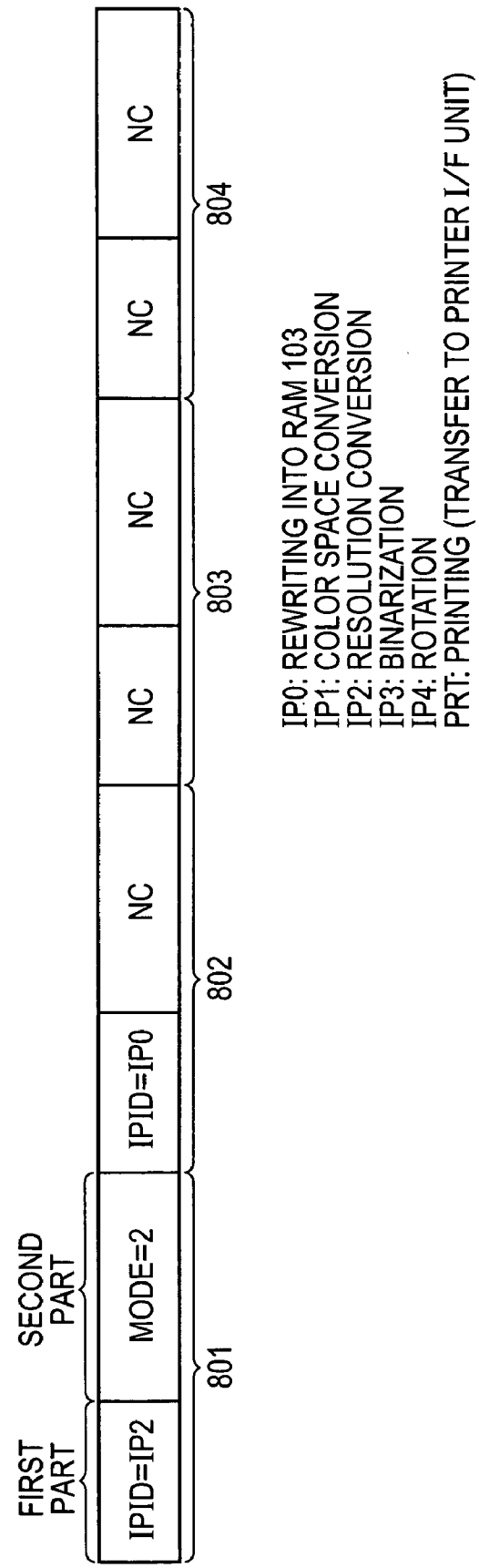
FIGS. 8A and 8B are diagrams illustrating exemplary details of a header of packet data according to an embodiment of the present invention.

Before the image processes are performed by the respective reconfigurable circuit units, the CPU 101 generates packet data from tile image data stored in the RAM 103. FIG. 8A illustrates the details of the header 800 of the generated packet data. The header 800 includes a first part 801 in which an ID (IPID) identifying an IP function to be used in the image processing shown in FIG. 7 is described, and a second part 802 in which a mode of the image processing in the IP function is described. The first part 801 is described at the beginning of the header 800, and the second part 802 is described after the first part 801. Although in the present embodiment, only the IPID and the mode are described in the header 800, other information such as the data length may be added.

More specifically, in the case in which the process is performed as shown in FIG. 7, IPID (=IP2) specifying the resolution conversion as the IP function to be performed first, and the image processing mode (=2) in the resolution conversion are described respectively in the first and second parts of the first header part 801. In the first part of the second header part 802, IPID (=IP0) specifying the writing-back into the RAM is described. In the second part of the second header part 802, NC is described to indicate that no image processing is performed. In a third header part 803 and a fourth header part 804, NC is described as the IPID and the mode to indicate that no processing is performed.

After the CPU 101 attaches, to the packet data, the header indicating the order in which to perform IP functions and the mode of the respective IP functions, the CPU 101 transfers the packet data to the reconfigurable circuit manager 206 in the image processing unit 104.

Figure 15:
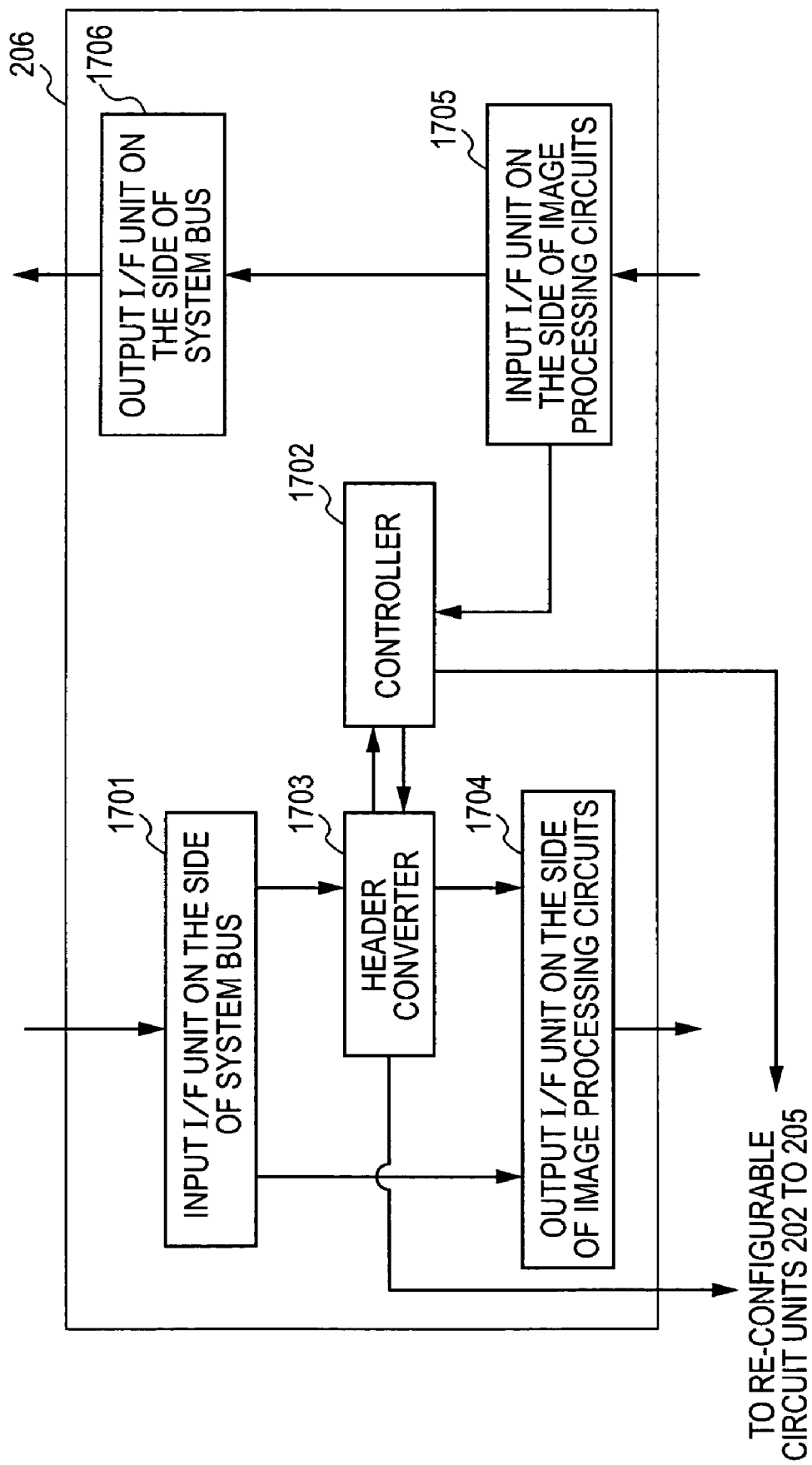
FIG. 15 is a block diagram illustrating an exemplary reconfigurable circuit manager according to an embodiment of the present invention.

The reconfigurable circuit manager 206 is now described in further detail below. As shown in FIG. 15, the reconfigurable circuit manager 206 includes an input I/F unit on the side of the system bus 1701, a controller 1702, a header converter 1703, an output I/F unit on the side of the image processing circuit 1704, an input I/F unit on the side of the image processing circuit 1705, and an output I/F unit on the side of the system bus 1706.

Figure 8B:

If the input I/F unit on the side of the system bus 1701 receives the packet data via the system bus, the input I/F unit 1701 extracts the header from the packet data and determines whether image processing is to be performed on the packet data, (that is, whether one of IP1 to IP4 is specified by IPID in the header 800 shown in FIG. 8A), or a printing process is to be performed according to the packet data (that is, whether PRT is specified by IPID as with the header 805 shown in FIG. 8B). In the former case, the packet data is transferred to the header converter 1703, but the packet data is transferred to the output I/F unit on the side of the image processing circuit 1704 in the latter case.

Under the control of the controller 1702, the header converter 1703 converts the header as shown in FIG. 10 and transmits the resultant packet data to the output I/F unit on the side of the image processing circuit 1704. The header conversion process includes the following two steps. First, the first part of each header part in which IPID specifying an image process to be performed is described as with the header 800 is rewritten such that a module ID indicating a reconfigurable circuit unit specified by the controller 1702 is described as with a header 1000. In the second part of the header in which writing-back into the RAM is described, a packet ID identifying the packet data to which the current tile image data belongs is described. If the output I/F unit on the side of the image processing circuit 1704 receives the packet data, the output I/F unit 1704 transfers the received packet data to the printer I/F unit 107 or the reconfigurable circuit units 202 to 205.

If the input I/F unit on the side of the image processing circuit 1705 receives the packet data from the crossbar switch 201, the input I/F unit on the side of the image processing circuit 1705 extracts the packet ID from the second part of the first header part. Note that the data transferred from the printer I/F unit 108 includes no valid packet ID. One or more of the reconfigurable circuit unit 202 to 205 specified by the module IDs described in the packet data are released, and the data is transferred to the output I/F unit on the side of the system bus 1706. The output I/F unit on the side of the system bus 1706 writes back the data into the RAM 103 via the system bus.

Figure 14:
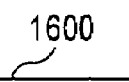
FIG. 14 is a diagram illustrating an example of a management table according to an embodiment of the present invention.

The controller 1702 has a management table 1600 such as the exemplary table shown in FIG. 14. The management table 1600 is used to manage the status of each of the reconfigurable circuit units 202 to 205 in terms of whether it is being used to process some packet, which packet is being processed by each reconfigurable circuit unit if the reconfigurable circuit unit is being used, and which IP function is implemented by each reconfigurable circuit unit. Based on the management table 1600, the controller 1702 issues commands to the header converter 1703 and the reconfigurable circuit units 202 to 205.

In the example shown in FIG. 14, the management table 1600 indicates that two packets with packet IDs PACKET1 and PACKET2 are being processed by reconfigurable circuit units. More specifically, the packet with the packet ID PACKET1 is being processed by the reconfigurable circuit unit 202 reconfigured so as to function as the resolution converter (IP2), and the packet with the packet ID PACKET2 is being processed by the reconfigurable circuit units 203 and 205 reconfigured respectively as the resolution converter (IP2) and the binarization circuit (IP3).

Further, in the exemplary table shown in FIG. 14, reconfigurable circuit unit 204 is currently reconfigured so as to function as the color space conversion circuit (IP1), but the reconfigurable circuit unit 204 is not currently used to process any packet.

The exemplary process associated with the packet data performed by the reconfigurable circuit manager 206 is now described below with reference to flow charts shown in FIGS. 9A to 9C and FIG. 16.

[Exemplary Process Performed when Packet Data is Input Via the Input I/F on the Side of the System Bus]

First, the process performed when packet data is input via the input I/F unit on the side of the system bus 1701 is described with reference to FIGS. 9A to 9C. Note that the process can be performed under the control of the controller 1702. If packet data is input (step S901), the controller 1702 determines whether image processing should be performed on the received packet data by checking whether one of IP1 to IP4 is specified in the first part of the first header part 801 of the header (step S902).

In a case in which the packet data does not need any IP function, that is, in a case in which PRT is specified in the first header part of the header, the controller 1702 directly transmits the packet data to the I/F unit on the side of the image processing circuits 1705 (step S907) and also transmits the packet data to the printer I/F unit 107 via the crossbar switch 201 (step S907).

On the other hand, in a case in which the packet data includes a header such as a header 800 specifying that the packet data should be subjected to an image process, the controller 1702 transfers the packet data to the header converter 1703 (step S903). The header converter 1703 inquires of the controller 1702 as to whether there is an available reconfigurable circuit unit. Then the controller 1702 searches the management table 1600 for an available reconfigurable circuit unit (step S904).

The step (S904) of searching for an available reconfigurable circuit unit is described in detail below and further shown in the flow diagram in FIG. 9B. First, the header converter 1703 or the controller 1702 examines the first part of the header to determine the number of types of IP processes needed by the packet data (step S909). For example, the header 800 shown in FIG. 8A indicates that one type of IP process is needed, and the header 1100 shown in FIG. 11 indicates that thee types of IP processes are needed. Then the controller 1702 reserves as many reconfigurable circuit units as the number of types of IP processes determined in step S909 (step S910). In the reservation step S910, the controller 1702 examines the management table 1600 to determine whether there is an available reconfigurable circuit unit that is not in current use (step S911). If it is determined that there is no available reconfigurable circuit unit, the process waits for some reconfigurable circuit unit to become available (step S912). On the other hand, if it is determined that there is an available reconfigurable circuit unit, the detected available reconfigurable circuit unit is reserved (step S913). The reservation step described above is performed repeatedly to reserve as many reconfigurable circuit units as needed.

After the reconfigurable circuit units are reserved in step S913, the controller 1702 reconfigures the reserved reconfigurable circuit units such that they function as circuits for performing IP functions specified by IPID described in the header (step S905 from FIG. 9A). Thereafter, the management table 1600 is updated and the header conversion is performed (step S906).

The details of step S906 are now described below with reference to FIG. 9C. The controller 1702 generates a packet ID uniquely identifying the packet data (step S915). The controller 1702 then registers (or updates), in the management table 1600, reservation information indicating reconfigured reconfigurable circuit units and also indicating IP functions implemented by respective reconfigured reconfigurable circuit units (step S916), and information indicating these reconfigurable circuit units are in use by the packet having the packet ID generated in step S915 (step S917).

Figure 11:
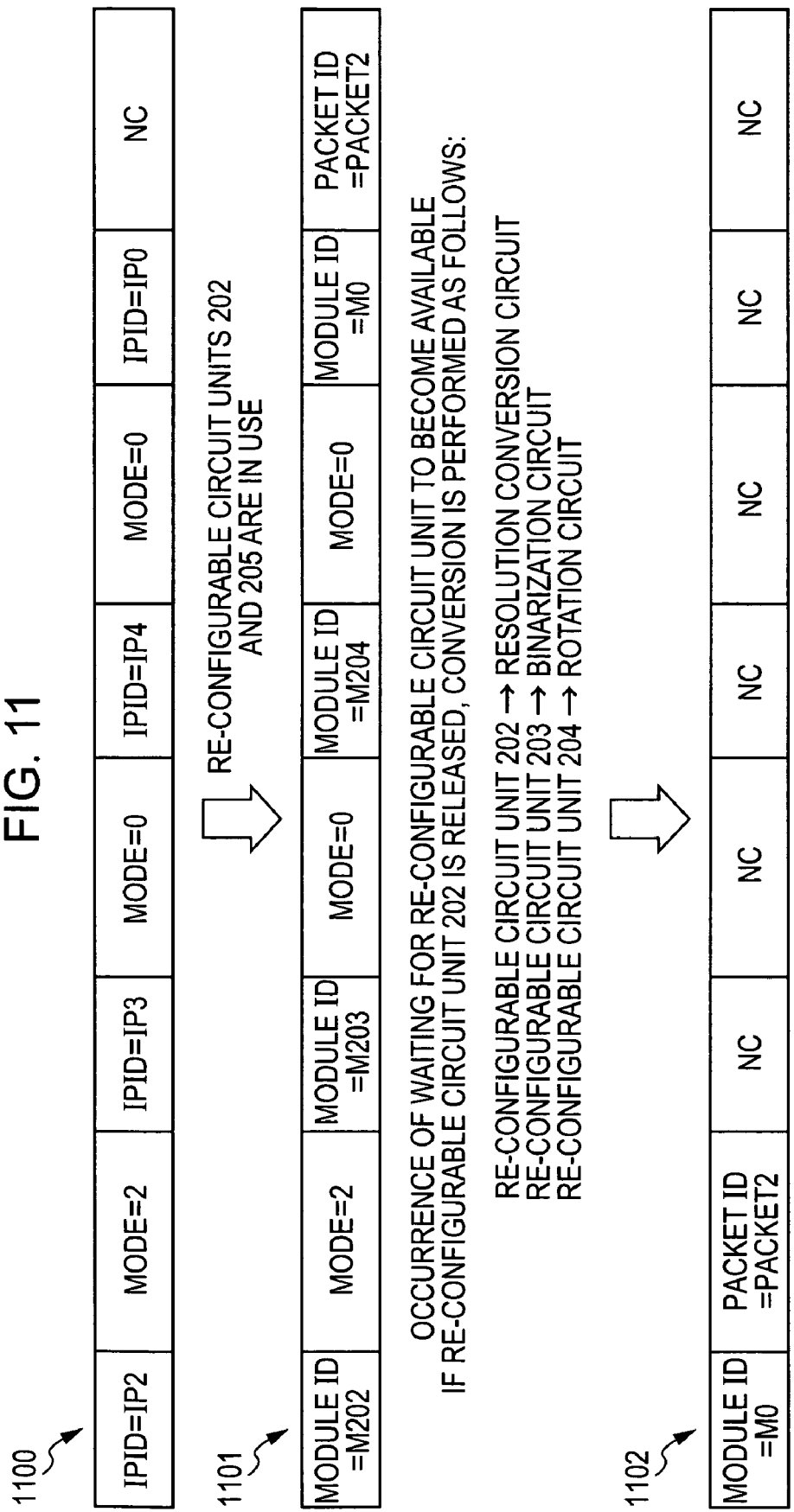
FIG. 11 is a diagram illustrating an exemplary conversion of a header according to an embodiment of the present invention.

The controller 1702 informs the header converter 1703 of the IDs (module IDs) of the reconfigurable circuit units described in the updated management table 1600. As shown in FIGS. 10 and 11, the header converter 1703 converts the IPIDs described in the first parts of the header into the module IDs informed by the controller 1702 (step S918), and the packet ID is added to the header part in which writing back into the RAM 103 is specified (step S919).

After the process described above is completed, the header converter 1703 transfers the packet data to the output I/F unit on the side of the image processing circuit 1704 (step S907 from FIG. 9A). The output I/F unit on the side of the image processing circuit 1704 transfers the received packet data to the respective reconfigurable circuit units or the printer I/F 108 unit via the crossbar switch 201 (step S908).

Therefore, the process performed when packet data is input via the input I/F unit on the side of the system bus 1701 has been described above with reference to FIGS. 9A to 9C.

[Exemplary Process Performed when Packet Data is Input Via the Input I/F Unit on the Side of the Image Processing Circuit]

Now, the exemplary process performed by the reconfigurable circuit manager 206 when packet data is input via the input I/F unit on the side of the image processing circuit 1705 is described below with reference to a flow chart shown in FIG. 16. Note that the process can be performed under the control of the controller 1702.

First, if packet data is input to the input I/F unit on the side of the image processing circuit 1705 (step S1801), the reconfigurable circuit manager 206 extracts information (packet ID) described in the second part of the first header of the received packet data (step S1802). The extracted packet ID is transferred to the controller 1702. The controller 1702 updates the management table 1600 so as to indicate that a reconfigurable circuit unit used by the packet with the detected packet ID is released (step S1803). More specifically, in the management table 1600 shown in FIG. 14, information indicating packet IDs that are using reconfigurable circuit units is updated.

Next, the input I/F unit on the side of the image processing circuit 1705 transfers the packet data to the I/F unit on the side of the system bus 1706 (step S1804). Then I/F unit on the side of the system bus 1706 transfers the received packet data to the RAM 103 via the system bus such that the packet data is rewritten into the RAM (step S1805).

Two specific examples are described below as to IP function processes performed on packet data input from the input I/F unit on the side of the system bus 1701 in the reconfigurable circuit manager 206, and also as to a description of the header and setting of the management table. Note that in these two examples, respective steps are performed by the similar processing units as those which perform the steps shown in FIG. 9. Also note that the process in each example described below can be performed under the control of the controller 1702.

EXAMPLE 1

When the management table is in such a state as denoted by reference numeral 1900 in FIG. 17A, if packet data having such a header as denoted by reference numeral 800 in FIG. 8A is input from the input I/F unit on the side of the system bus 1701, a process is performed as follows.

First, when packet data is received in step S901, a determination is made in step S902 as to whether an IP function is needed. In this specific case, IP2 is specified in the first part of the first header of the packet, and thus it is determined in step S902 that an IP function corresponding to IP2 is needed. Thus, the packet data is transferred to the header converter 1703 (see FIG. 15).

Thereafter, in step S904, the reconfigurable circuit unit searching process is performed in a similar manner as described above. In step S909 in the reconfigurable circuit unit searching process described above with reference to FIG. 9B, it is determined from the first part of the header that a resolution conversion (IP2) is specified as the IP function to be performed. Based on the acquired information, one reconfigurable circuit unit is reserved in the reservation iteration loop starting from step S910.

More specifically, in this exemplary case, the controller 1702 determines from the management table 1900 that reconfigurable circuit units 203 and 204 are currently available, and thus, in step S913, the controller 1702 reserves the reconfigurable circuit unit 203. Note that although the reconfigurable circuit unit 203 is reserved herein according to a round-robin algorithm, the reconfigurable circuit unit 204 may be reserved herein instead of the reconfigurable circuit unit 203.

Then in step S905 (from FIG. 9A), the controller 1702 issues a command to reconfigure the reconfigurable circuit unit 203 as a resolution converter. Thereafter, the process proceeds to step S906. In step S915 (from FIG. 9C), which is a sub-step of step S906, as described above, a PACKET1 is generated as a packet ID uniquely identifying the packet. Thereafter, in steps S916 and S917, the management table in the state 1900 (from FIG. 17) is rewritten such that IP2 indicating the function implemented by the reconfiguration and PACKET1 serving as the packet ID of the packet that needs the function IP2 are registered in a row of the reconfigurable circuit unit 203. As a result, the management table is updated into a state 1901 shown in FIG. 17.

In the next step S918, the header converter 1703 rewrites IP2 in the first header part and IP0 in the second header part into M203 indicating the reconfigurable circuit unit 203 and M0 indicating writing-back into the RAM 103 as shown in a state denoted by reference numeral 1000 in FIG. 10. Furthermore, in step S919, PACKET1 generated in step S913 is written into the second part of the second header part indicating the writing-back into the RAM.

In step S907, the packet data is transferred from the header converter 1703 to the output I/F unit on the side of the image processing circuit 1704. In step S908, the output I/F unit on the side of the image processing circuit 1704 transfers the received packet data to the reconfigurable circuit unit 203 via the crossbar switch 201.

When the packet data is returned to the input I/F unit on the side of the image processing circuit 1705 to be written back into the RAM 103 after the process (described later) performed by the reconfigurable circuit unit is completed, the header of the packet data is in a state 1005 shown in FIG. 10.

If the input I/F unit on the side of the image processing circuit 1705 receives the packet data in step S1801 (from FIG. 16), the input I/F unit on the side of the image processing circuit 1705 extracts the packet ID of the PACKET1 from the second part of the first header in step S1802. In step S1803, the controller 1702 rewrites data in the row associated with the reconfigurable circuit unit 203 in the table in the state 1901 (see FIG. 17) into a state 1902 (see FIG. 17) in order to release the reconfigurable circuit unit 203 used by the packet data. In step S1804 (see FIG. 16), the input I/F unit on the side of the image processing circuit 1705 (see FIG. 15) transfers the packet data to the output I/F unit on the side of the system bus 1706. In step S1805, the output I/F unit on the side of the system bus 1706 writes back the packet data into the RAM 103 via the system bus.

EXAMPLE 2

When the management table is in such a state 2000 shown in FIG. 18, if packet data with a header in a state 1100 shown in FIG. 11 is input from the input I/F unit on the side of the system bus 1701 (see FIG. 15), the exemplary process which will be described next is performed. Note that the process is also performed under the control of the controller 1702 as in Example 1 described above.

First, when packet data is received in step S901 (see FIG. 9A), it is determined in step S902 that IP functions are needed, because IP2, IP3, and IP4 are specified in the first parts of the respective first, second, and third headers. Thus, the packet data is transferred to the header converter 1703 (see FIG. 15).

Thereafter, in step S904 (see FIG. 9A), the reconfigurable circuit unit searching process is performed. In step S909, from the first parts of the respective headers, it is determined that three IP functions, that is, the resolution conversion (IP2), the binarization (IP3), and the rotation (IP4), are needed. Thus, three reconfigurable circuit units are reserved in the reservation iteration loop starting from step S910.

Figure 9B:
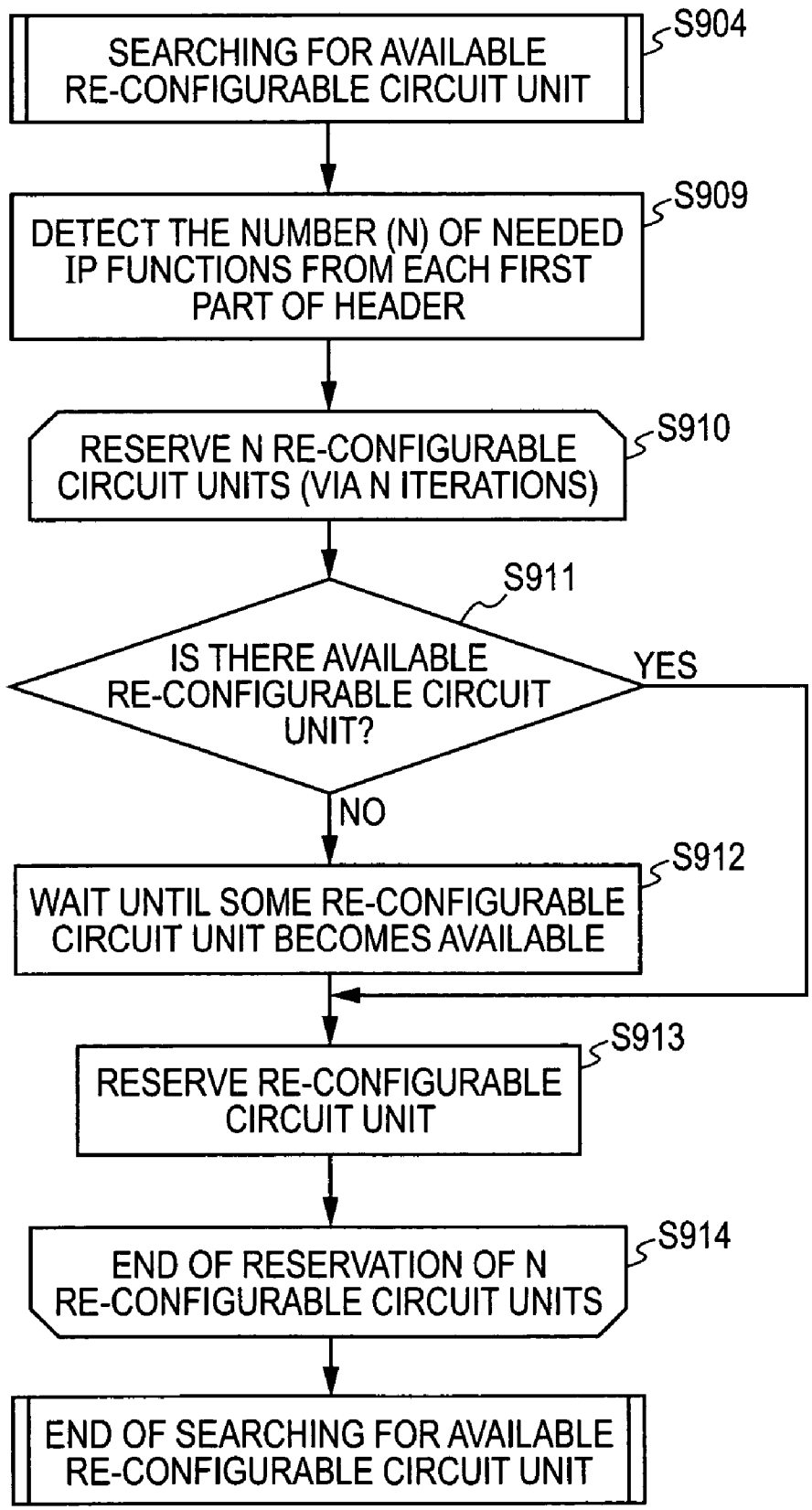
FIGS. 9B and 9C are flow charts illustrating exemplary details of the process, according to an embodiment of the present invention.
Figure 9C:
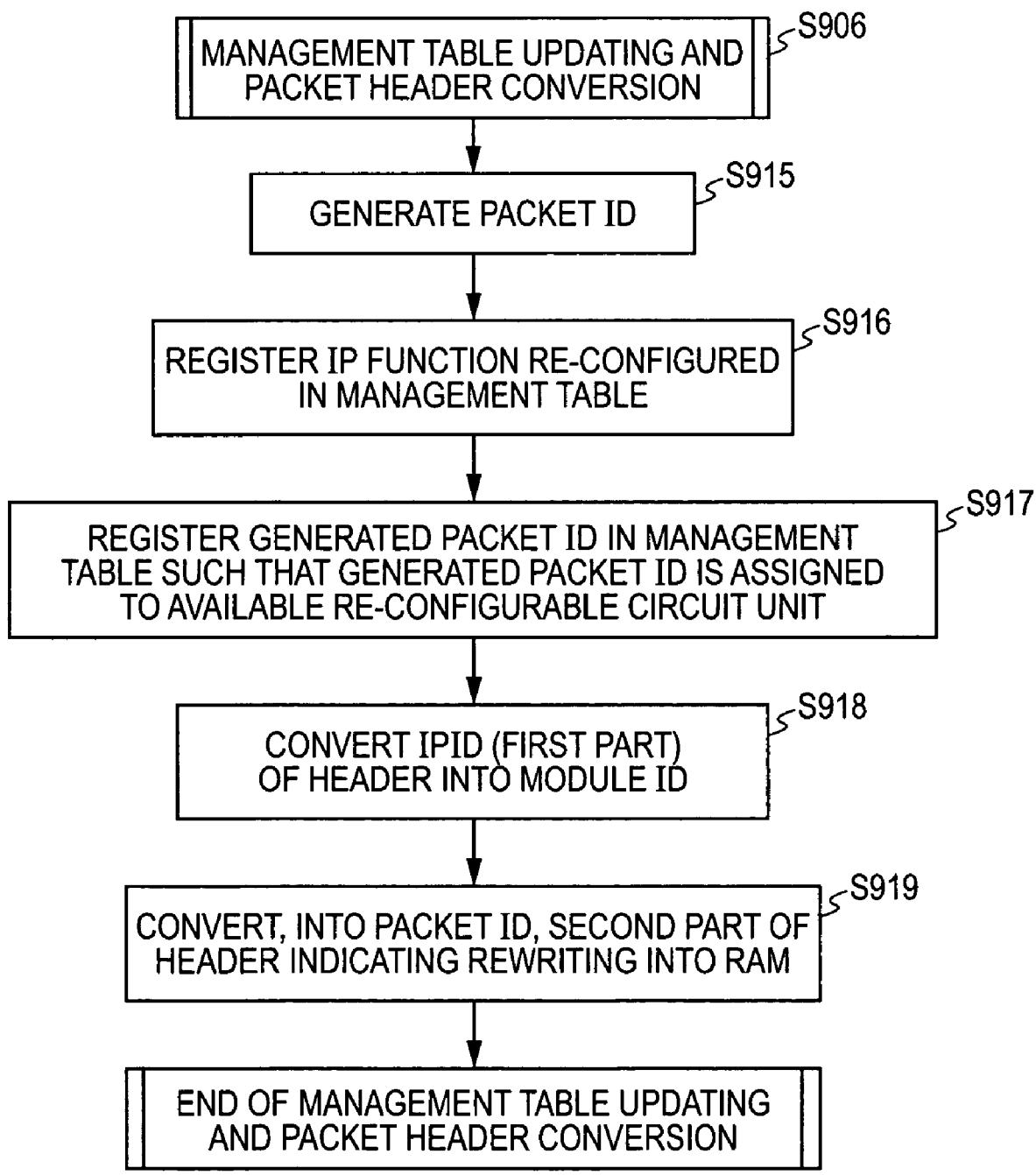

More specifically, in this specific case, the management table 2000 (see FIG. 18) indicates that only two reconfigurable circuit units 203 and 204 are currently available, and thus waiting for a reconfigurable circuit unit to become available occurs in the iteration loop to reserve a third reconfigurable circuit unit (step S912 from FIG. 9B).

In step S1803 (see FIG. 16), if the reconfigurable circuit unit 202 used previously by a packet with a packet ID PACKET0 is released, the table in the state 2000 (see FIG. 18) is updated into a state 2001. If the updating of the table in the state 2000 into the state 2001 is performed, the third reconfigurable circuit unit becomes available, and thus the process proceeds from the waiting step S912 (see FIG. 9B) to step S913. In step S913, the third reconfigurable circuit unit is reserved.

Thereafter, in step S905 (see FIG. 9A), the controller 1702 (see FIG. 15) commands the reconfigurable circuit units 202, 203, and 204 to be reconfigured as a resolution converter, a binarization circuit, and a rotation circuit, respectively. Thereafter, the process proceeds to step S906. In step S913 (see FIG. 9B), a PACKET2 is generated as a packet ID uniquely identifying the present packet. Thereafter, in steps S916 and S917 (see FIG. 9C), the management table in the state 2001 (see FIG. 18) is rewritten such that IP2, IP3, and IP4 indicating the IP functions implemented in the respective reconfiguration reconfigurable circuit units 202, 203, and 204 and PACKET2 serving as the packet ID of the packet that needs the functions IP2, IP3, and IP4 are registered in rows of the respective reconfigurable circuit units 202, 203, and 204. As a result, the management table is updated into a state 2002 shown in FIG. 18.

In step S918 (see FIG. 9C), the header converter 1703 (see FIG. 16) rewrites data in the first parts of the respective first to fourth header parts into M202, M203, and M204 indicating the respective reconfigurable circuit units and M0 indicating writing-back into the RAM as shown in a state denoted by reference numeral 1101 in FIG. 11. Furthermore, in step S919, PACKET2 generated in step S915 is written into the second part of the fourth header part indicating the writing-back into the RAM.

In step S907 (see FIG. 9A), the packet data is transferred from the header converter to the output I/F unit on the side of the image processing circuit 1704. In step S908, the output I/F unit on the side of the image processing circuit 1704 transfers the received packet data to the reconfigurable circuit unit 203 via the crossbar switch 201.

When the packet data is returned to the input I/F unit on the side of the image processing circuit 1705 to be written back into the RAM 103 after the process (described later) performed by the reconfigurable circuit units is completed, the header of the packet data is in a state 1102 shown in FIG. 11.

If the input I/F unit on the side of the image processing circuit 1705 receives the packet data in step S1801 (see FIG. 16), the input I/F unit on the side of the image processing circuit 1705 extracts the packet ID of the PACKET2 from the second part of the first header in step S1802. In step S1803, the controller 1702 rewrites data in the rows associated with the respective reconfigurable circuit units 202, 203, and 204 in the table in the state 2002 into a state 2003 (see FIG. 18) in order to release the reconfigurable circuit units 202, 203, and 204 used by the packet data. In step S1804, the input I/F unit on the side of the image processing circuit 1705 transfers the packet data to the output I/F unit on the side of the system bus 1706. In step S1805, the I/F unit on the side of the system bus 1706 transfers the received packet data to the RAM 103 via the system bus such that the packet data is written back into the RAM 103.

As can be seen from the examples described above, when the number of IP functions to be performed on packet data is small, it is possible to reconfigure available reconfigurable circuit units into IP function circuits and perform processing in parallel on a plurality of packet data. This makes it possible to perform image processing at a higher speed than is possible by the conventional technique.

For the packet data having the header shown in FIG. 8A, after the header is converted into the state 1000 shown in FIG. 10, and the packet data is transferred to the reconfigurable circuit unit 203 via the crossbar switch 201, the subsequent process is performed as described below.

Figure 6:
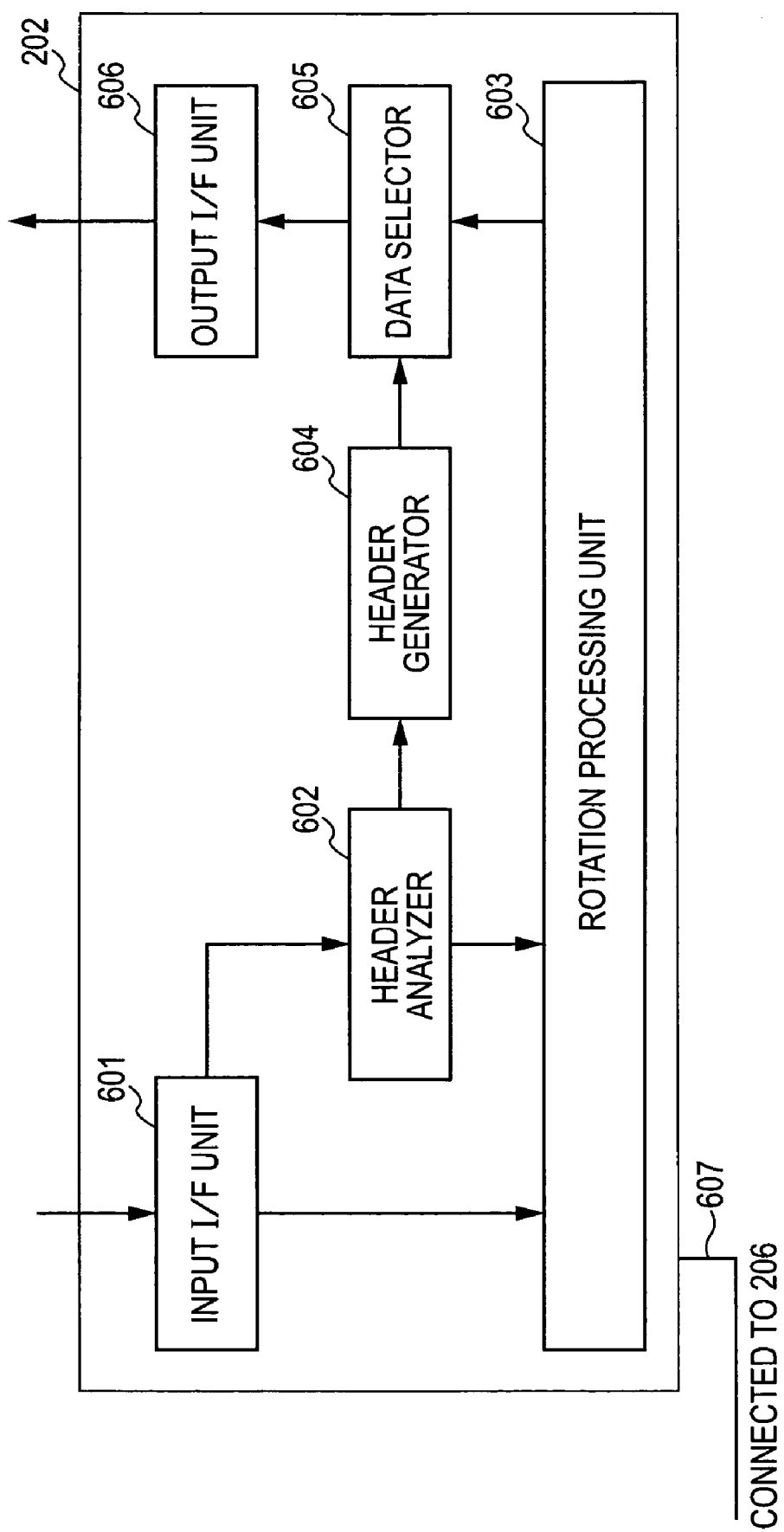
FIG. 6 is a block diagram illustrating an exemplary architecture of a reconfigurable circuit unit according to an embodiment of the present invention.

When the reconfigurable circuit unit 203 is reconfigured into the resolution converter in accordance with a command issued by the reconfigurable circuit manager 206, the internal structure thereof is similar to the internal structure of the reconfigurable circuit unit 202 configured as a rotation circuit shown in FIG. 6 except that the rotation processing unit 603 is replaced with a resolution conversion processing unit. Thus, the following explanation is made with reference to FIG. 6 in which the rotation processing unit 603 is assumed to be replaced with the resolution conversion processing unit.

If the reconfigurable circuit unit 203 reconfigured so as to function as the resolution converter receives packet data, the input I/F unit 601 divides the packet data into a header and tile image data. The header is transferred to the header analyzer 602, and the tile image data is transferred to the resolution conversion processing unit 603. The header analyzer 602 analyzes the header to detect the operation mode (mode-2) described in the first header part 1001 (see FIG. 10). In accordance with the detected operation mode, mode-2 is set as the operation mode in which the resolution conversion processing unit (implemented by replacing the rotation processing unit 603 shown in FIG. 6) should operate.

The resolution conversion processing unit performs image processing in mode-2 on the image data received from the input I/F unit 601. For example, if the input tile image data has a resolution of 600×600 dpi, and the image processing in mode-2 is conversion into a resolution of 100×400 dpi, an image reduction is performed.

Next, the header generator 604 deletes the module ID and the operation mode assigned to the present reconfigurable circuit unit from the header information, and the header generator 604 shifts the data in the header information to the left such that the second header part 1002, in which a reconfigurable circuit unit to be used to perform the next IP function or writing back into the RAM 103 is specified, comes to the first position of the header. Thus, the resultant header is in the state 1005.

That is, information associated with the writing back into the RAM is described in the first header part, and NC (no information) is described in the third and fourth header part 1003 and 1004 at the end of the header. The data selector 605 outputs the rewritten header and the processed image data as packet data to the output I/F unit 606. This packet data is then transmitted to the reconfigurable circuit manager 206 via the crossbar switch.

The reconfigurable circuit manager 206 releases the reconfigurable circuit unit 202 used to process the packet data described above such that the reconfigurable circuit unit 202 becomes available to process another packet data.

[Exemplary MFP Electronic Sorting Process]

Now a description is given as to the manner in which the MFP according to the embodiment of the present invention operates at a high speed, when a user issues an operation command to use one of functions of the MFP and the MPF performs the image processing corresponding to the specified function on image data. In the following description, by way of example, it is assumed that a copying process using electronic sorting is specified as the function to be performed.

First, electronic sorting is described briefly. In a known technique, when a plurality of copies of a document are made, the printer unit of the MFP ejects printed sheets into a plurality of bins such that each copy is stacked on each bin without being mixed.

In recent years, a digital copying machine has been proposed, which ejects printed sheets into a single bin such that orientations of printed sheets are set to different directions for each set of copies. In this digital copying machine, input image data is rotated by a proper angle as required, and a printer unit forms an image on paper in accordance with the rotated image data, thereby changing the orientation of printed sheets of paper.

The MFP according to the first embodiment of the invention includes reconfigurable circuit units 202 to 205, which can be configured so as to function as a rotation circuit, disposed in the image processing unit 104. Thus, the MFP according to the present embodiment is capable of performing electronic sorting by properly controlling the scanner unit 106 and the printer unit 109 by the CPU 101 and performing the image processing using the reconfigurable circuit unit 205.

When electronic sorting is performed in the MFP according to the first embodiment, image data flows as described below. First, a document is read by the scanner unit 106 in a similar manner to the process from step S402 to step S404 shown in the flow chart of FIG. 4, and resultant tile image is stored in the RAM 103. When the document has a large number of pages, and all tile image data cannot be stored in the RAM 103, the tile image data may be stored on an HDD (not shown) as required.

The CPU 101 generates packet data by attaching, to the tile image data stored in the RAM 103, a header including processing information specifying a 90°-rotation and processing order information indicating that the processed data should be written back into the RAM 103. The generated packet data is transmitted to the image processing unit 104 and is rotated by 90° by one of the reconfigurable circuit units 202 to 205 reconfigured so as to function as the rotation circuit according to the command issued by the reconfigurable circuit manager 206. The resultant rotated packet data is written back as tile image data into the RAM 103. In a case in which, unlike the current image processing unit 104, fixed circuits are separately disposed for the color space conversion, the resolution conversion, the binarization, and the rotation, when a plurality of packet data which need only rotation are dealt with, packets are processed one by one in a pipeline. To concurrently process a plurality of packet data in parallel, it is needed to provide a plurality of fixed circuits for the rotation.

In contrast, in the image processing unit 104 according to the first embodiment, when a plurality of reconfigurable circuit units are available, they can be reconfigured so as to function as rotation circuits, and thus it is possible to concurrently process a plurality of packet data in parallel. This allows an increase in the speed of an operation (electronic sorting, in this specific example) of the MFP.

After the tile image data is rotated by the image processing unit 104 and written back into the RAM 103, the CPU 101 transfers the resultant tile image data to the printer I/F unit 108. The printer I/F unit 108 converts the tile image data into image data in units of pages. The resultant page image data is transmitted to the printer unit 109. The printer unit 109 forms an image on paper in accordance with the received image data.

The process described above is performed repeatedly until as many copies as specified are output. Note that the rotation angle is changed from one copy to another to achieve electronic sorting.

Therefore, electronic sorting process performed by the MFP according to the first embodiment of the invention has been described above.

[Exemplary PDL Process]

In order to illustrate some more of the advantages provided by the first embodiment of the invention, the operation of the MFP is described below for a specific case in which a PDL (Page Description Language) printing process using electronic sorting and a process of reading an A3-size document and printing a reduced image on A4-size paper are performed in parallel in a competitive fashion.

To perform the PDL printing operation using electronic sorting and the copying operation for outputting a reduced image of an A3-size document image on A4-size paper, the image processing unit 104 needs to have the following IP functions.

In the PDL printing operation using electronic sorting, image data is generated from PDL data by a rasterization circuit and is printed on paper. A rotation function is needed as an IP function to electronically sort image data when the image data is printed on paper.

Figure 12:
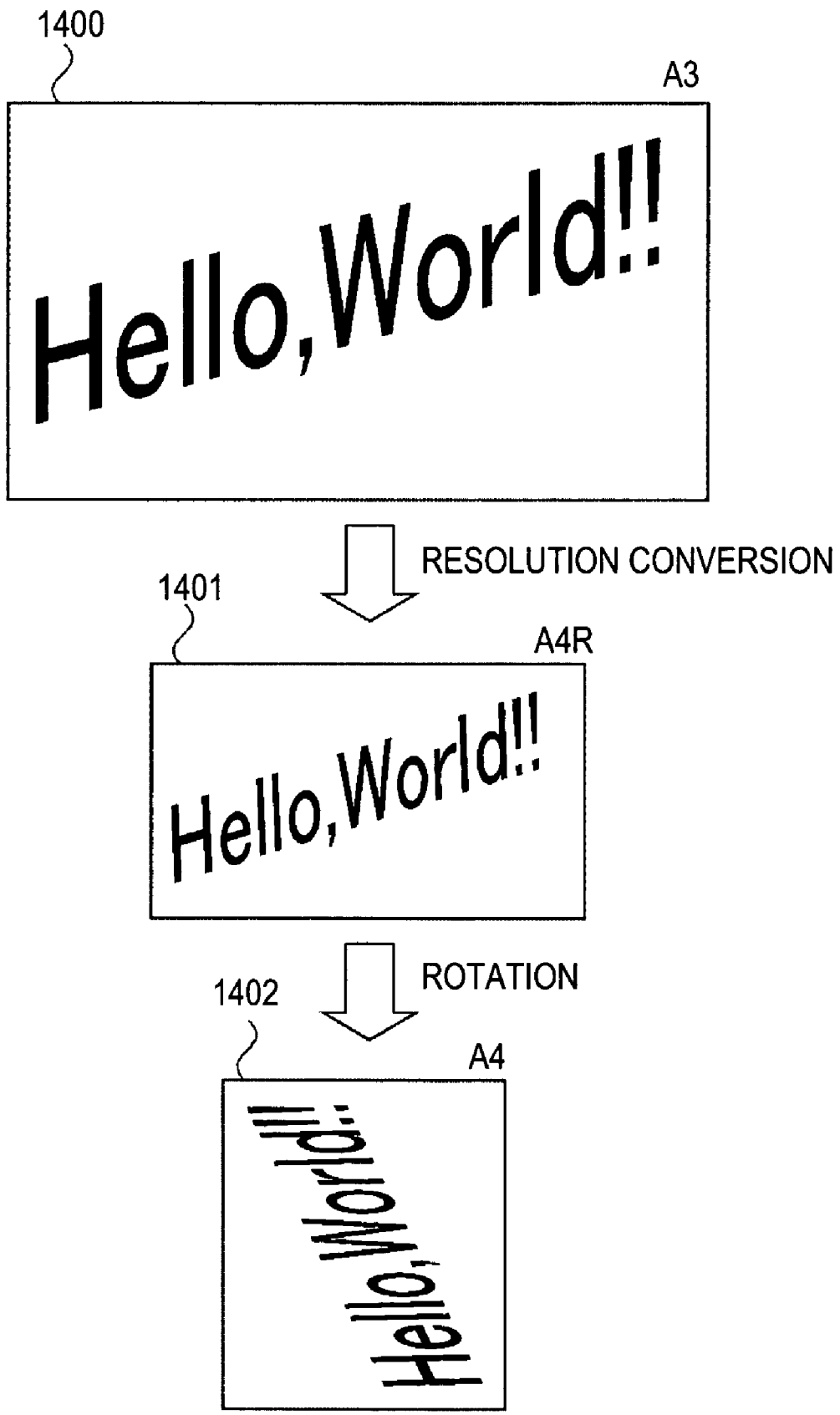
FIG. 12 is a diagram illustrating an example of image processing according to an embodiment of the present invention.

On the other hand, in the reduction copying operation for outputting a reduced image of an A3-size document on A4-size paper, a resolution conversion function and a rotation function are needed as IP functions, as can be seen from FIG. 12. In particular, an image 1400 from an A3-size document is subjected to a resolution conversion which results in a reduced image 1401 for an A4R-size document, which is further subjected to rotation which results in a final image 1402 for an A4-size document.

Figure 13A:
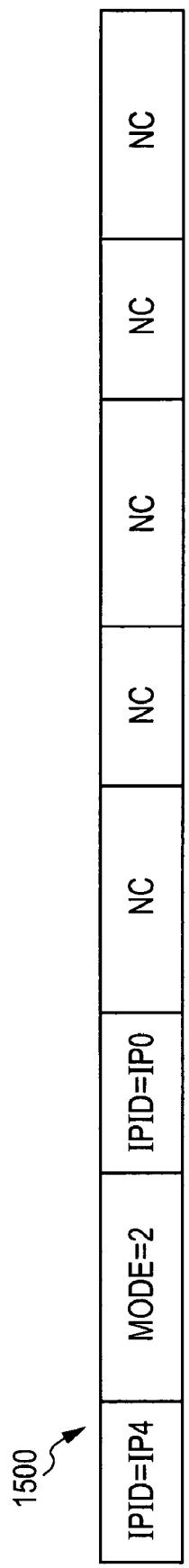
FIGS. 13A and 13B illustrate an exemplary conversion of a header in the example of the image processing shown in FIG. 12 according to an embodiment of the present invention.
Figure 13B:
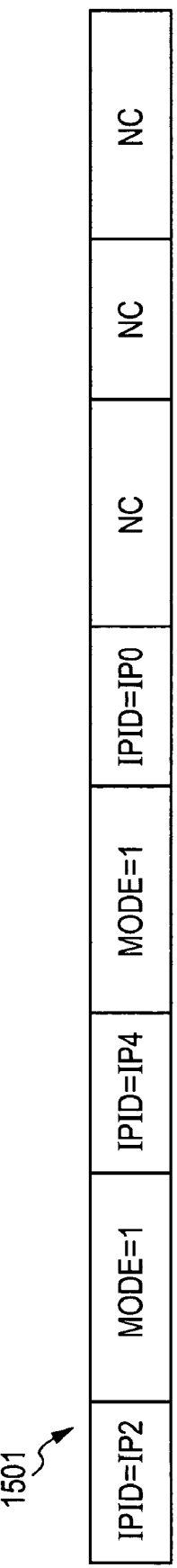

FIG. 13A shows an example of a header 1500 attached to a packet in the PDL printing operation using electronic sorting. FIG. 13B shows an example of a header 1501 attached to a packet in the A3-to-A4 reduction copying operation.

Both in the PDL printing operation using electronic sorting and in the A3-to-A4 reduction copying operation, the image processes performed on packet data by the image processing unit 104 include the rotation process. As described above, in the case in which image processes are performed by circuit modules capable of performing fixed IP functions, it is impossible to simultaneously perform the rotation process on a plurality of packet data in parallel unless fixed circuit modules include two or more fixed circuit modules capable of performing the rotation process.

In contrast, in the first embodiment, the image process on packet data needed in the PDL printing operation using electronic sorting can be performed independently by using one reconfigurable circuit unit, and the image processes on packet data needed in the A3-to-A4 reduction copying operation can be performed independently by using two reconfigurable circuit units. Therefore, it is possible to process a plurality of packet data in parallel by using a total of three reconfigurable circuit units configured so as to perform the needed IP functions. Thus, the MFP according to the first embodiment can operate in a very efficient manner.

In the first embodiment, as described above, packet data is generated by adding, to tile image data, a header including information indicating the order in which to perform image processes and information indicating processing modes, and the generated packet data is transmitted to the image processing unit. In the image processing unit, the reconfigurable circuit manager searches for an available reconfigurable circuit unit. If an available reconfigurable circuit unit is detected, the reconfigurable circuit manager issues a command to reconfigure the detected reconfigurable circuit unit so as to function as a specified IP function circuit.

Furthermore, the reconfigurable circuit manager rewrites the header of the packet data such that an IPID identifying the IP function to be implemented is replaced with a module ID identifying the reconfigured reconfigurable circuit unit. Thereafter, the packet data is transferred to the reconfigured reconfigurable circuit unit via the crossbar switch. Furthermore, the reconfigurable circuit manager gets information indicating which reconfigurable circuit units are in use for IP function processes and information indicating configurations thereof.

This makes is possible to process packet data in parallel, and thus an increase in the operation speed of the MFP is achieved. This also makes it possible to perform IP function processes on packet data in parallel without causing an increase in the circuit complexity. Furthermore, because reconfigurable circuit units are reconfigured as circuits for specified IP functions as required, a high circuit usage efficiency is achieved.

Second Exemplary Embodiment

A second embodiment based on the first embodiment is now herein described below. In this second embodiment, the image processing circuit according to the first embodiment is further improved in terms of the simultaneous operability, the reduction in the circuit complexity, and the reduction in the power consumption.

The structure of the MFP serving as an image processing apparatus according to the second embodiment is similar to that according to the first embodiment illustrated in the form of the block diagram in FIG. 1, and thus FIG. 1 will be referred to in the following description.

Furthermore, the structure of the image processing unit 104 according to the second embodiment is similar to that according to the first embodiment, and thus no further explanation thereof is given herein. However, the second embodiment is different in that the IP functions that can be implemented by the reconfigurable circuit-units 202 to 205 include a filtering (edge enhancing) function in addition to the four IP functions in the first embodiment, that is, the color space converting function, the resolution converting function, the binarizing function, and the rotating function. Here, the filtering function is a function of filtering an input image to enhance edges of the input image.

Figure 19:
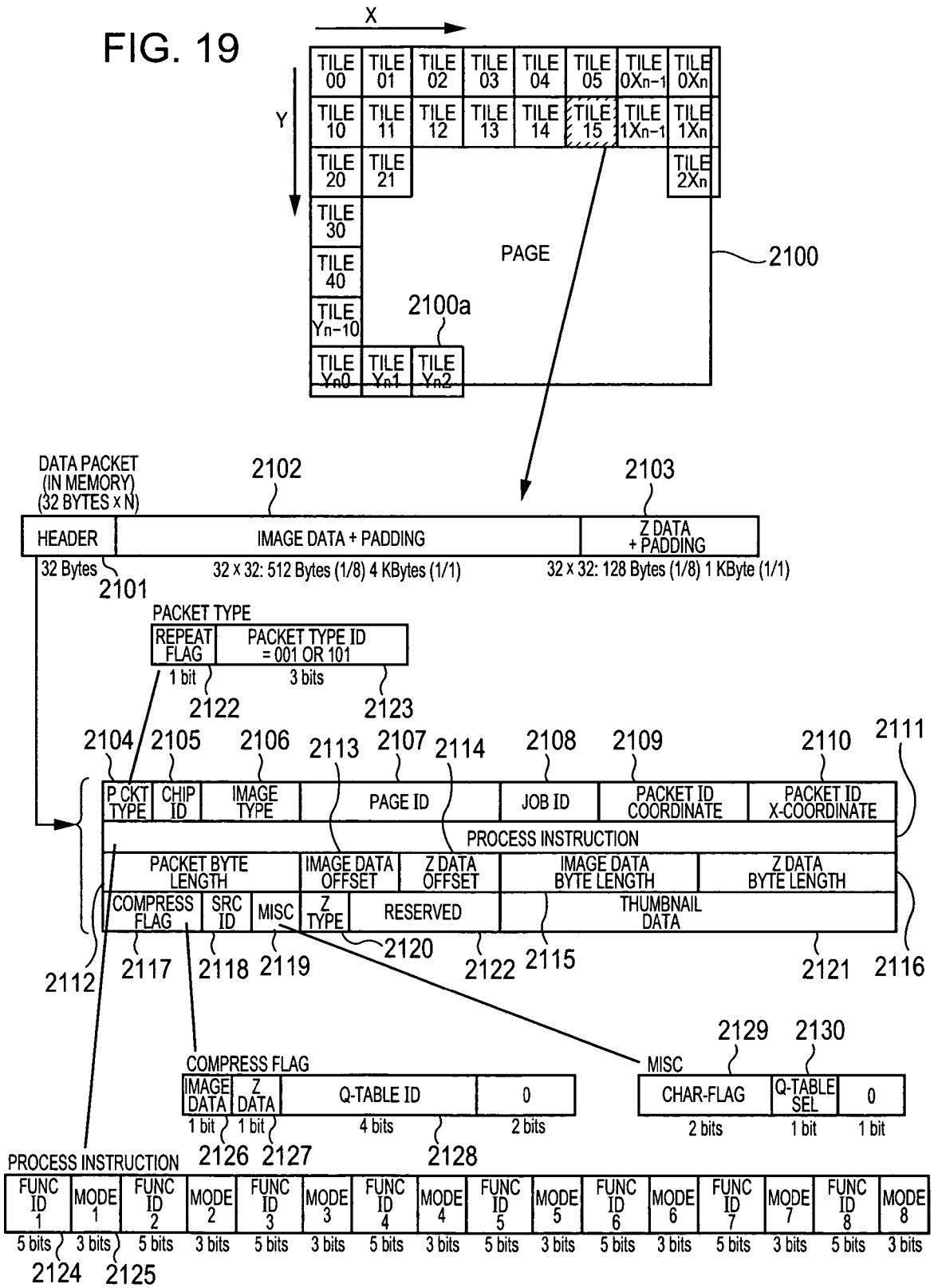
FIG. 19 is a diagram illustrating exemplary packet data according to an embodiment of the present invention.

Now, packet data and a method of producing the packet data according to the second embodiment are described. FIG. 19 shows a format of packet data according to the second embodiment of the present invention. Although the format of the packet data according to the second embodiment is similar to that according to the first embodiment, the format is described in further detail below.

[Exemplary Packet Data]

In the second embodiment, image data 2100 is divided into tile image data 2100a each having a size of 32 pixels×32 pixels. Packet data is generated by adding header information 2101 and additional image information 2103 to tile image data 2102.

Information included in the header information 2101 is described below. A packet type ID 2123 in a packet type 2104 in the header information 2101 indicates the packet type of the packet. There are three packet types: a data packet, a command packet, and an interrupt packet. More specifically, in the present embodiment, the packet type is represented by 3 bits of the packet type ID as follows:

001b or 101b: data packet,
010b: command packet, and
100b: interrupt packet.

Note that in this example, only data packets are dealt with. The packet type 2104 includes a repeat flag 2122 that is set to 1 when image data 2102, additional image information 2103, and header information 2101 of a data packet are identical to those of an immediately previous data packet. In this case, a packet including only header information 2101 is transmitted.

A chip ID 2105 identifies a chip that is a destination of a packet. However, in the present embodiment, the chip ID 2105 is not used and is fixed to "0".

An image type 2106 indicates the type of image data. In the present embodiment, the image data type is represented by high-order two bits of eight bits of the image type as follows:

00b: one pixel of image data is represented by one bit,
01b: one pixel of image data is represented by one 8-bit component,
10b: one pixel of image data is represented by three 8-bit components, that is, by a total of 24 bits, and
11b: one pixel of image data is represented by four 8-bit components, that is, by a total of 32 bits.

A page ID 2107 indicates a page in which the data packet is included. A job ID 2108 identifies a job managed by software. The high-order two bits of the job ID 2108 are used to indicate priority such that "00" indicates the highest priority and the priority decreases with the value.

The order in which data packets are arranged on a page is represented by a combination of a tile coordinate 2109 in a Y direction and a tile coordinate 2110 in an X direction, that is, by YnXn.

The data packet may be in a compressed form in which image data and additional image information of the packet are compressed, or in an uncompressed form. In the present embodiment, when the data packet is compressed, the compression is accomplished according to the JPEG algorithm (or similar algorithm) as a compression algorithm when image data is multi-level color image data (or multi-level gray scale image data), and packed bits are employed for binary image data and additional image information.

Image data 2126 and Z data 2127 in the compress flag 2117 respectively indicate whether the image data and the additional image data are compressed or not. More specifically, when image data 2126 or Z data 2127 is "1", the data is in the compressed form, but the data is in the uncompressed form when the value is "0".

The compress flag 2117 includes a Q-table ID 2128 indicating the type of a quantization table used in the JPEG compression process. When there are two or more quantization tables, a quantization table used in the quantization or dequantization of data is switched according to the value of the Q-table ID 2128.

However, in the second embodiment, image data is in the form of a bit map image without being compressed, and thus the compress flag 2117 is not used.

A process instruction 2111 is set in a left-justified form for every 8 bits for respective image processes. When the reconfigurable circuit unit performs the image process, the process instruction 2111 is shifted by 8 bits to the left each time the image processing is completed. The process instruction 2111 includes eight sets of a function ID 2124 and a mode 2125. Each function ID 2124 specifies an IP function to be performed, and each mode 2125 specifies an operation mode employed for the IP function. Thus, up to eight IP functions can be performed successively on one packet.

A packet byte length 2112 indicates the total number of bytes of the packet. An image data byte length 2115 indicates the number of bytes of image data. A Z data byte length 2116 indicates the number of bytes of the additional image information. An image data offset 2113 and a Z data offset 2114 respectively indicate the offset values of the image data and the additional image information.

A source ID 2118 indicates a source from which the image data and the additional image information were generated. A Z type 2120 indicates the valid bit-width of the additional image information. A part of the additional image information other than the bits indicated by the Z type 2120 is regarded as invalid. When the Z type 2120 is equal to 0, all input additional image information is regarded as invalid.

Any data in a reserved area 2122 is meaningless in the present embodiment. A thumbnail data 2121 indicates representative values (thumbnail values) of image data of the packet data. In the present embodiment, the thumbnail data 2121 is allowed to include up to four thumbnail values.

A misc data 2119 is information other than the information described above. In the present embodiment, the misc data 2119 includes a char-flag 2129 and Q-table Sel data 2130. The char-flag 2129 is an area signal indicating an area to which the data packet belongs. The Q-table Sel data 3030 includes information specifying a quantization table used in the JPEG compression or decompression.

[Exemplary Generation of Packet Data]

The generation of packet data according to the second embodiment is performed in a similar manner to the generation of the packet data 300 according to the first embodiment described earlier with reference to FIG. 4, and thus a further description thereof is not given herein.

Now, the reconfigurable circuit units 202 to 205 are described. In the following explanation, similar features to those in the first embodiment are denoted by similar reference numerals, and explanations thereof are not given herein. The following discussion on the second embodiment with reference to FIG. 20 is focused on features different from those of the first embodiment.

In the second embodiment, a header analyzer 2202 determines the details of the rotation process from 8-bit information at the left-most position of the process instruction.

If a header generator 2204 receives the header from the header analyzer 2202, the header generator 2204 shifts the process instruction of the header by 8 bits to the left thereby generating the header for next packet data to be input to the image processing unit. In the case of the rotation process, the X-coordinate and the Y-coordinate of the packet ID are changed to proper values.

A reconfigurable circuit manager 2306, which will be described later, issues a circuit configuration selection signal 2207 to specify which one of the five image processing functions should be implemented by reconfiguring the reconfigurable circuit unit 202. This signal 2207 serves not only as a configuration command signal but also as a trigger signal for causing the input I/F unit to start a packet reception operation. The circuit configuration selection signal 2207 is similar to the circuit configuration selection signal 607 according to the first embodiment.

The reconfigurable circuit manager 2306 also issues a circuit status signal 2208 indicating the current status of the reconfigurable circuit unit 202. This circuit status signal 2208 is peculiar to the second embodiment. When the reconfigurable circuit unit 202 is being operated, the circuit status signal 2208 is at an H-level, but otherwise it is at an L-level.

The reconfigurable circuit units 203 to 205 each have an internal architecture similar to that described above. When some of reconfigurable circuit units 202 to 205 are reconfigured so as to implement one of the other IP functions, the internal architecture is similar to that described above except that the IP function unit is changed from the rotation processing unit to a color space conversion processing unit, a resolution conversion processing unit, a binarization processing unit, or a filtering unit.

Now, with reference to FIG. 21, FIGS. 22A to 22C, and FIGS. 23A and 23B, the reconfigurable circuit manager 2306 according to the second embodiment is described in further detail below.

FIG. 21 is a block diagram illustrating the internal structure of the reconfigurable circuit manager 206. As shown in FIG. 21, the reconfigurable circuit manager 206 includes an input I/F unit on the side of the system bus 2301, a controller 2302, a header converter 2303, an output I/F unit on the side of the image processing circuit 2304, an input I/F unit on the side of the image processing circuit 2305, and an output I/F unit on the side of the system bus 2306.

Figure 23A:
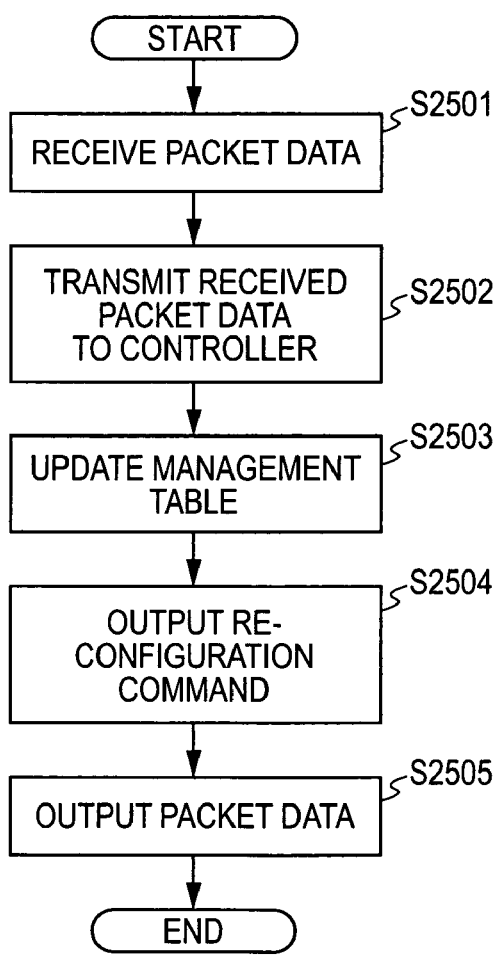
FIGS. 23A and 23B are flow charts illustrating exemplary control processes according to an embodiment of the present invention.
Figure 23B:
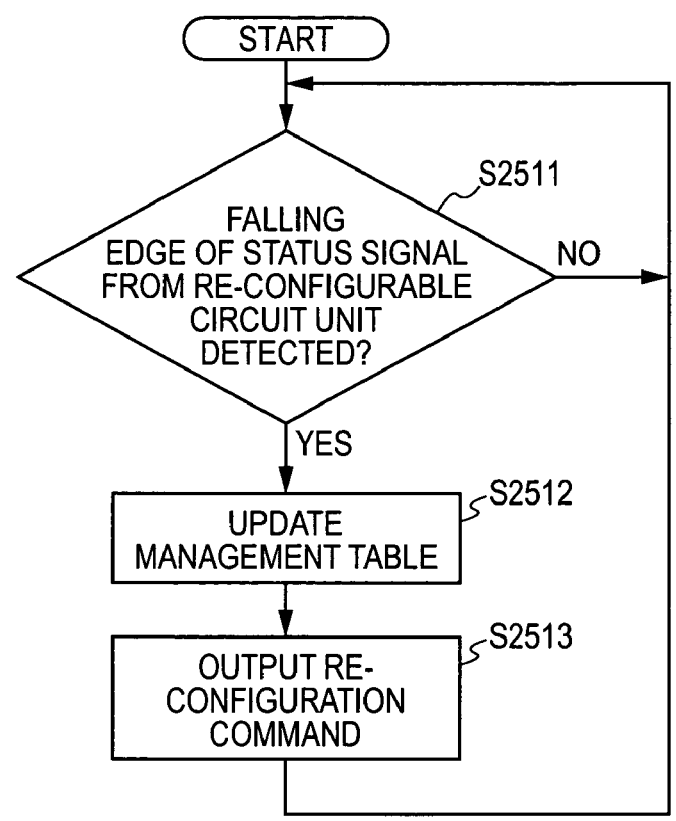

An exemplary operation of the reconfigurable circuit manager 2306 is described below with reference to FIGS. 22A to 22C showing a reconfigurable circuit management table in various states and FIGS. 23A and 23B showing, in the form of flow charts, the operation of the reconfigurable circuit manager 2306 and flow of packets.

In FIG. 23, if the input I/F unit on the side of the system bus 2301 receives the packet data via the system bus (step S2501), the input I/F unit on the side of the system bus 2301 transfers the received packet data to the controller 2302 (step S2502).

FIGS. 22A to 22B illustrate a management table in various states used by the controller 2302. The controller 2302 analyzes the packet header and rewrites the management table based on the process instruction information described in the header and the information indicating the current status of the reconfigurable circuit units described in the management table (step S2503). The rewriting of the management table will be described in further table later.

FIG. 22A shows the management table in a state 2400 updated, when no reconfigurable circuit units are being operated, so as to indicate that, according to the process instruction of a packet transmitted to the reconfigurable circuit manager 2306, the packet is to be subjected to a color space conversion process, a filtering process, and a binarization process.

Based on the information described in the management table rewritten by the controller 2302, the header converter 2303 converts the function IDs in the process instruction into IDs uniquely assigned to the respective reconfigurable circuit units, and the transfers the resultant packet data to the output I/F unit on the side of the image processing circuit 2304. Based on the rewritten management table, the controller 2302 transmits a reconfiguration command signal 2207 to a reconfigurable circuit unit (step S2504). In this specific case, a reconfiguration command is supplied to the reconfigurable circuit unit 202 to reconfigure it so as to function as a color space conversion circuit. Based on the head information included in the received packet data, the output I/F unit on the side of the image processing circuit 2304 transfers the packet data to the specified reconfigurable circuit units 202 to 205 via the crossbar switch. More specifically, the packet specified in the management table 2400 is transferred to the reconfigurable circuit unit 202 (step S2505).

When the reconfigurable circuit unit 202 receives the image data via the crossbar switch, the operation mode is set in the above-described manner, and the header is converted. Thereafter, the image processing (the color space conversion process) is performed, and the result is output to the crossbar switch from the output I/F unit 2306. As described earlier, each of the reconfigurable circuit units 202 to 205 outputs a status signal 2208 to the reconfigurable circuit manager 2306. If the controller 2302 detects a falling edge of the status signal output from some of the reconfigurable circuit units 202 to 205 (step S2511 from FIG. 23B), the controller 2302 updates the management table (step S2512).

FIG. 22B shows the management table in a state 2401 updated after the color space conversion process is completed. As can be seen, the function IDs in the row associated with the reconfigurable circuit unit 202 have been shifted to the left. When the management table is updated, the controller 2302 outputs a reconfiguration command signal 2207 to the reconfigurable circuit unit 202 to reconfigure it so as to function as a filtering circuit (step S2513).

To the reconfigurable circuit unit 202 reconfigured according to the reconfiguration command signal, an image data packet output from the output I/F unit 2304 via the crossbar switch is input via the input I/F unit 2201. The image processing is performed on the input image data packet in a similar manner as described above.

At this point of time, if the controller 2302 receives a new packet from the system bus, the management table is updated into a state 2402 as shown in FIG. 22C. In accordance with the updated management table, a reconfiguration command is output to the reconfigurable circuit unit 203, and an image process is performed. Thus, image processes are performed in parallel.

When information described in the process instruction has been all deleted, the present image data packet is transferred from the reconfigurable circuit manager 206 to the RAM 103 via the system bus.

[Exemplary Generation of a Management Table]

Figure 24:
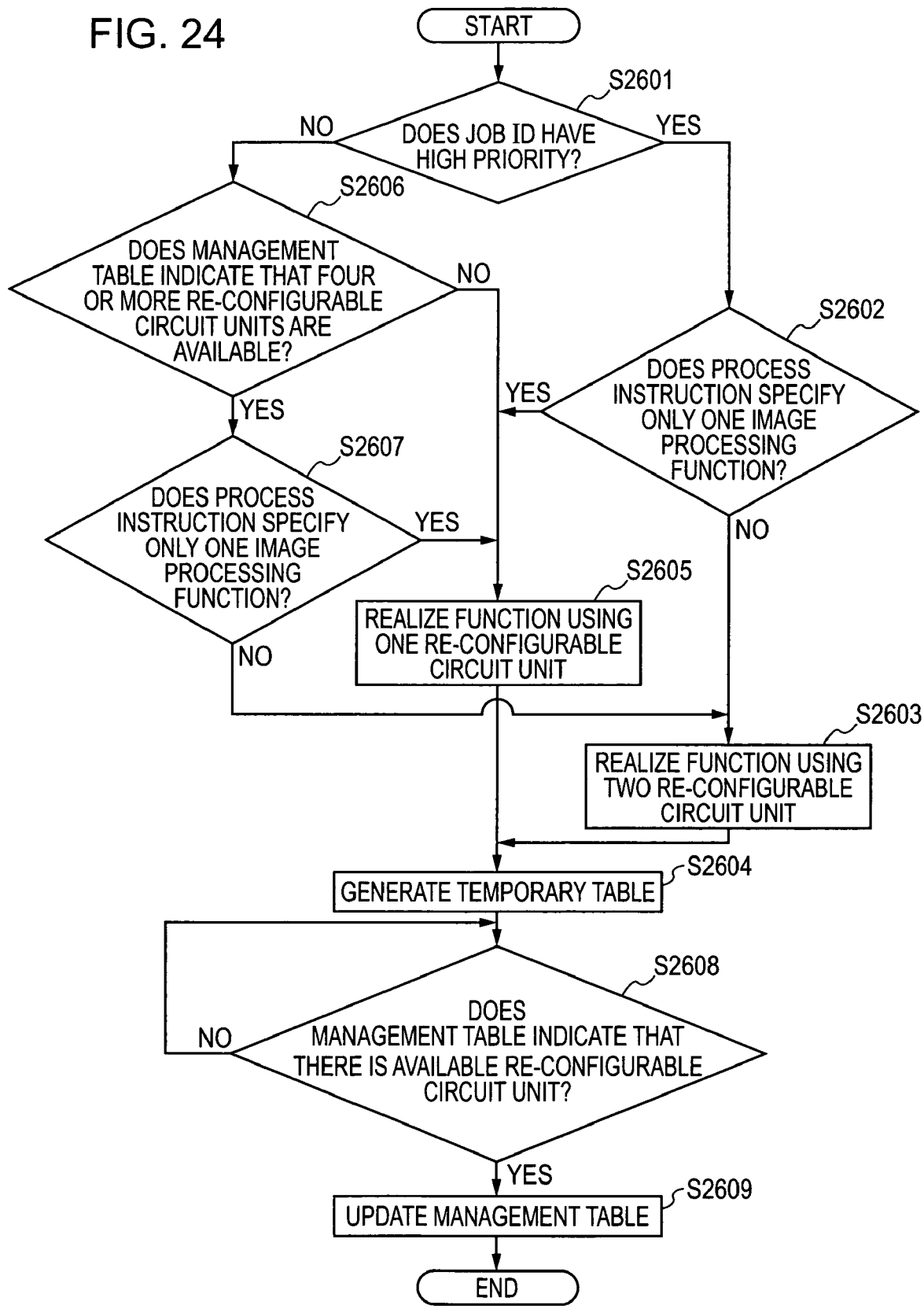
FIG. 24 is a flow chart illustrating exemplary details of a control process performed by a reconfigurable circuit manager according to an embodiment of the present invention.

The generation of an exemplary management table is described in further detail below with reference to a flow chart shown in FIG. 24. The process described below is performed by the controler 2302 included in the reconfigurable circuit manager 206 or by an external CPU.

The controller 2302 analyzes the priority information in the Job ID of an input packet (step S2601). If the priority is high, the controller 2302 further analyzes the number of image processing functions specified in the process instruction (step S2602). If only one image processing function is specified, the controller 2302 decides to reconfigure one reconfigurable circuit unit to perform the specified image process (step S2605). In a case in which two or more image processing functions are specified, the controller 2302 decides to alternately reconfigure two reconfigurable circuit units to perform the specified image processes (step S2603).

In a case in which the priority information described in the job ID is low, the controller 2302 examines the management table to determine whether there is one or more available_reconfigurable circuit units (step S2606). If four or more available reconfigurable circuit units are not detected, the controller 2302 decides to reconfigure one reconfigurable circuit unit to perform the specified image process (step S2605). On the other hand, if four or more available reconfigurable circuit units are detected, the controller 2302 analyzes the number of image processing functions specified in the process instruction (step S2607). If only one image processing function is specified, the controller 2302 decides to reconfigure one reconfigurable circuit unit to perform the specified image process (step S2605). In a case in which two or more image processing functions are specified, the controller 2302 decides to alternately reconfigure two reconfigurable circuit units to perform the specified image processes (step S2603).

According to the decision, the controller 2302 generates a temporary table (step S2604), and checks the management table to determine whether there is one or more available reconfigurable circuit units (step S2608). If the management table has room that allows updating according to the temporary table, the management table is updated (step S2609).

In the second embodiment, as described above, the table for managing the reconfigurable circuit units is generated or updated as required based on the status information associated with the reconfigurable circuit units and information indicating the priority of a packet, thereby making it possible to perform image processes in an optimum manner depending on the situation such that when a plurality of image processes are performed on a packet with high priority, all reconfigurable circuit units are reconfigured to perform the plurality of image processes, but when a plurality of image processes are performed on a packet with low priority, some of reconfigurable circuit units are reconfigured to perform the plurality of image processes. This makes it possible to perform a plurality of image processes in parallel in a more efficient manner. Furthermore, the improvement in the operation efficiency in the parallel processing makes it possible to achieve a high operation performance similar to that achieved in the first embodiment by using a lower-complexity circuit. A reduction in the power consumption of the image processing apparatus is also achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-326584 filed Nov. 10, 2004, which is hereby incorporated by reference herein in its entirety.

What is claimed is:

1. An image processing apparatus adapted to perform a plurality of image processes on image data, comprising:
   a dividing unit adapted to divide input image data into area images with a predetermined size;
   a data generation unit adapted to generate data by adding type information indicating a type of an image process to be performed to the area image;
   an image processing unit including a plurality of image processing sub-units each adapted to be capable of performing a plurality of types of image processes on the area images and adapted to be capable of being changed in circuit configuration to perform the plurality of types of image processes;
   a commanding unit adapted to command at least one of the plurality of image processing sub-units to be changed so as to have a circuit configuration capable of performing an image process specified by the type information; and
   a transfer control unit adapted to transfer the area image to the image processing sub-unit specified by the commanding unit to be changed in the circuit configuration.

2. The image processing apparatus according to claim 1, wherein the data generation unit generates data including the type information and processing content information specifying a parameter or a condition associated with the image process specified by the type information; and
   wherein the image processing sub-unit specified by the commanding unit performs the image process in accordance with the process parameter information.

3. The image processing apparatus according to claim 1, wherein when a plurality of types of image processes are performed successively on the image data, the data generation unit generates data by adding, to the area image, a plurality of pieces of type information specifying the plurality of types of image processes and order information specifying the order of performing the plurality of image processes specified by the plurality of pieces of type information.

4. The image processing apparatus according to claim 1, further comprising a conversion unit adapted to convert the type information included in the data into designation information designating the image processing sub-unit to which the area image should be transferred, the image processing sub-unit being specified by the commanding unit to be changed in the circuit configuration, wherein
   the transfer control unit transfers the area image to the image processing sub-unit in accordance with the designation information.

5. The image processing apparatus according to claim 1, wherein the data generation unit generates priority information indicating the priority of the image data together with the type information and adds the type information and the priority information to the area image; and when the data generated by the data generation unit includes the plurality of pieces of type information and when the priority information indicates high priority, the commanding unit commands two or more image processing sub-units to be changed so as to respectively have circuit configurations capable of performing the image processes specified by the plural pieces of type information, while when the data generated by the data generation unit includes the plurality of pieces of type information and when the priority information indicates low priority, the commanding unit commands one image processing sub-unit to be changed so as to have a circuit configuration capable of performing an image process specified by one of the plurality of pieces of type information.

6. The image processing apparatus according to claim 1, wherein the commanding unit manages the circuit configuration and the operation status of each image processing sub-unit by using a table; and the commanding unit updates the table based on the type information added to the data generated by the data generation unit.

7. A method of controlling an image processing apparatus having a processor therein that performs a plurality of types of image processes on image data, the method comprising:

utilizing the processor to perform the steps of, dividing input image data into area images with a predetermined size;

generating data by adding type information indicating a type of an image process to be performed to the area image;

commanding at least one of a plurality of image processing sub-units, which are capable of performing the plurality of types of image processes on the area images, to be changed so as to have a circuit configuration capable of performing an image process specified by the type information; and transferring the area images to the image processing sub-unit specified by the commanding unit to be changed in the circuit configuration.

8. The method of controlling the image processing apparatus according to claim 7, wherein data generation includes generating data including the type information and processing content information specifying a parameter or a condition associated with the image process specified by the type information; and wherein the image processing sub-unit performs the image process in accordance with the process parameter information.

9. The method of controlling the image processing apparatus according to claim 7, wherein in the data generation, when a plurality of types of image processes are performed successively on the image data, data is generated by adding, to the area image, a plurality of pieces of type information specifying the plurality of types of image processes and order information specifying the order of performing the plurality of image processes specified by the plurality of pieces of type information.

10. The method of controlling the image processing apparatus according to claim 7, further comprising converting the type information included in the data into designation information designating the image processing sub-unit to which the area image should be transferred, the image processing sub-unit being specified, in the commanding step, to be changed in the circuit configuration, wherein the area image is transferred to the image processing sub-unit in accordance with the designation information.

11. The method of controlling the image processing apparatus according to claim 7, wherein the data generation step includes generating priority information indicating the priority of the image data together with the type information and adding the type information and the priority information to the area image; and in the commanding step, when the data generated includes the plurality of pieces of type information and when the priority information indicates high priority, two or more image processing sub-units are commanded to be changed so as to respectively have circuit configurations capable of performing the image processes specified by the plurality of pieces of type information, while when the data generated includes the plurality of pieces of type information and when the priority information indicates low priority, one image processing sub-unit is commanded to be changed so as to have a circuit configuration capable of performing an image process specified by one of the plurality of pieces of type information.

12. The method of controlling the image processing apparatus according to claim 7, wherein the commanding step includes managing the circuit configuration and the operation status of each image processing sub-unit by using a table, and updating the table based on the type information added to the data generated.

* * * * *